(12) United States Patent
Frazier

(10) Patent No.: US 6,499,066 B1
(45) Date of Patent: Dec. 24, 2002

(54) METHOD AND APPARATUS FOR USING FIBRE CHANNEL TEST EXTENDED LINK SERVICE COMMANDS FOR INTERPROCESS COMMUNICATION

(75) Inventor: Giles R. Frazier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/407,048

(22) Filed: Sep. 27, 1999

(51) Int. Cl.⁷ .................... G06F 13/00; G06F 13/10
(52) U.S. Cl. ............... 710/5; 710/24; 710/36; 710/45; 710/100; 710/107; 709/227; 370/351
(58) Field of Search .............. 710/100, 36, 5, 710/107, 45, 24; 709/227; 370/351

(56) References Cited

U.S. PATENT DOCUMENTS

| | | | |
|---|---|---|---|
| 3,673,576 A | 6/1972 | Donaldson, Jr. ........ 710/20 |
| 3,725,864 A | 4/1973 | Clark et al. ........... 710/6 |
| 4,040,037 A | 8/1977 | Lawlor ................ 710/24 |
| 4,272,815 A | 6/1981 | Kadowaki et al. ....... 710/21 |
| 4,841,475 A | 6/1989 | Ishizuka .............. 710/29 |
| 5,008,808 A | 4/1991 | Fries et al. ........... 710/6 |
| 5,084,877 A | 1/1992 | Netravali et al. ...... 371/32 |
| 5,218,680 A | 6/1993 | Farrell et al. ........ 395/325 |
| 5,260,933 A | 11/1993 | Rouse ................. 370/14 |
| 5,367,661 A | 11/1994 | Hough et al. .......... 710/5 |
| 5,396,596 A | 3/1995 | Hashemi et al. ....... 711/113 |
| 5,442,637 A | 8/1995 | Nguyen ................ 371/5 |
| 5,526,484 A | 6/1996 | Casper et al. ........ 709/237 |
| 5,528,605 A | 6/1996 | Ywoskus .............. 371/33 |
| 5,566,304 A | 10/1996 | Regal ................ 395/285 |
| 5,577,172 A | 11/1996 | Vatland et al. ....... 395/114 |
| 5,584,039 A | 12/1996 | Johnson et al. ........ 710/6 |
| 5,584,041 A | 12/1996 | Odawara et al. ....... 710/14 |
| 5,611,070 A | 3/1997 | Heidelberger et al. .. 711/133 |
| 5,640,596 A | 6/1997 | Takamoto et al. ...... 710/21 |
| 5,666,358 A | 9/1997 | Paratore et al. ...... 370/347 |
| 5,708,961 A | 1/1998 | Hylton et al. ........ 455/4.2 |
| 5,748,684 A | 5/1998 | Sanchez .............. 375/357 |
| 5,764,392 A | 6/1998 | Van As ............... 359/124 |
| 5,768,530 A | 6/1998 | Sandorfi ............ 395/200.63 |
| 5,787,256 A | 7/1998 | Marik et al. ......... 709/238 |
| 5,835,925 A | 11/1998 | Kessler et al. ........ 711/2 |
| 5,845,147 A | 12/1998 | Vishlitsky et al. ..... 710/5 |
| 5,870,625 A | 2/1999 | Chan et al. ........... 710/5 |
| 5,872,911 A | 2/1999 | Berg ................. 395/183.19 |
| 5,878,227 A | 3/1999 | Wade et al. .......... 709/235 |
| 5,901,327 A | 5/1999 | Ofek ................. 711/100 |
| 5,930,480 A | 7/1999 | Staats ............... 709/244 |
| 5,938,735 A | 8/1999 | Malik ................ 709/238 |
| 5,952,932 A | 9/1999 | Sorensen ............. 340/825.07 |
| 5,959,995 A | 9/1999 | Wicki ................ 370/400 |
| 5,960,436 A | 9/1999 | Chang et al. ......... 707/101 |
| 6,000,012 A | 12/1999 | Freerksen et al. ..... 711/118 |
| 6,014,383 A * | 1/2000 | McCarty .............. 370/453 |
| 6,018,779 A | 1/2000 | Blumenau ............. 710/68 |
| 6,029,008 A | 2/2000 | Koyama .............. 395/839 |
| 6,052,744 A | 4/2000 | Moriarty et al. ...... 710/27 |
| 6,138,161 A * | 10/2000 | Reynolds et al. ..... 709/227 |
| 6,167,459 A | 12/2000 | Beardsley ............ 710/3 |
| 6,170,023 B1 | 12/2000 | Beardsley ............ 710/36 |
| 6,185,203 B1 * | 2/2001 | Berman ............... 370/351 |
| 6,188,702 B1 * | 2/2001 | Tornetta et al. ...... 370/535 |
| 6,205,498 B1 | 3/2001 | Habusha .............. 710/29 |
| 6,240,446 B1 * | 5/2001 | Casper et al. ........ 709/213 |

FOREIGN PATENT DOCUMENTS

| | | | | |
|---|---|---|---|---|
| EP | 0768769 A2 | 4/1997 | ............ | H04J/3/06 |
| JP | 02223329 A | 9/1990 | ............ | H02H/3/02 |

OTHER PUBLICATIONS

IBM TDB, 'Eliminating Two–Phse Commits for Function Shipping with a Log Server', vol. 37, Issue 2A, pp. 219–220, Feb. 1, 1994.*

* cited by examiner

Primary Examiner—Jeffrey Gaffin
Assistant Examiner—Rehana Perveen
(74) Attorney, Agent, or Firm—Floyd A. Gonzalez; Marc A. Ehrlich

(57) ABSTRACT

The present invention provides fiber channel networks the ability to use extended link service commands to convey implementation dependent information between ports.

8 Claims, 2 Drawing Sheets

METHOD AND APPARATUS FOR USING FIBRE CHANNEL TEST EXTENDED LINK SERVICE COMMANDS FOR INTERPROCESS COMMUNICATION

FIELD OF INVENTION

This invention relates to concept of transferring information in a computer program product for use with a computer system having a main storage device in processing communication with a plurality of input/output devices.

BACKGROUND OF THE INVENTION

In a network computing environment, multitudes of commands and requests for retrieval and storage of data are processed every second. To properly address the complexity of routing these commands and requests, a number of different resolutions have been implemented. In some data processing architectures, such as International Business Machines Enterprise System Architecture/390 (Enterprise System Architecture/390 is a registered trademark of International Business Machines Corporation), a channel subsystem is utilized to pass information between the main storage and input/output (I/O) devices. The channel subsystem includes one or more channel paths, each including one or more channels and one or more control units. Recently developed technologies such as the International Business Machines ESCON switch (ESCON is a registered trademark of International Business Machines Corporation), connect the I/O devices to the main memory through the control units using legacy channels to support the data transfer there between. system processors will require many more legacy channels than are presently in use to support the resulting increase of information transfer in the data processing systems. Current architectural constraints make the addition of such legacy channels an expensive proposition. A further challenge is to provide the link data rate required to support the data rates of new I/O devices such as DASDs and Tapes. In this case, simply adding more legacy channels does not adequately address the problem. A new architecture is needed that can scale up to the higher link speeds needed for normal transaction processing. Therefore, any new proposed architecture, must include a capacity to accommodate higher bandwidth channel links such as Fibre Channel links while providing better data rates and higher link speeds.

This application incorporates by reference the following patents and publications:

1) Fibre Channel Single Byte-2 (FC-SB-2) Architecture (AR-6865-00-POK)
2) Fibre Channel (FC-PH) REV 4.3 ANSI X3.230-199x
3) U.S. Pat. No. 5,526,484 to Casper et. al.

SUMMARY OF THE INVENTION

The present invention provides for a computer program product for use with a computer system having a main storage device in processing communication with an information device in processing communication with an information transfer interface mechanism capable of coupling to a plurality of input/output devices. The computer program device comprises of a data storage element included in the main storage device having a computer usable medium with computer readable program means for receiving and retrieving data and computer readable code means for concurrently receiving multiple packets of data from said interface mechanism. It also includes computer readable code means for concurrently storing multiple packets of data concurrently in said data storage element as well as computer readable code means for storage and retrieval of multiple packets of data concurrently between said interface mechanism and said data storage element. In one embodiment of the present invention the interface mechanism can include a control unit and channels and in yet another embodiment a fabric is in processing communication with the control unit and the channels. The computer product can also comprise computer readable code for transferring information using time division multiplexing. It can also comprise computer readable code for interleaving multiple starts each to a separate device on one channel by using multiplexing capability.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
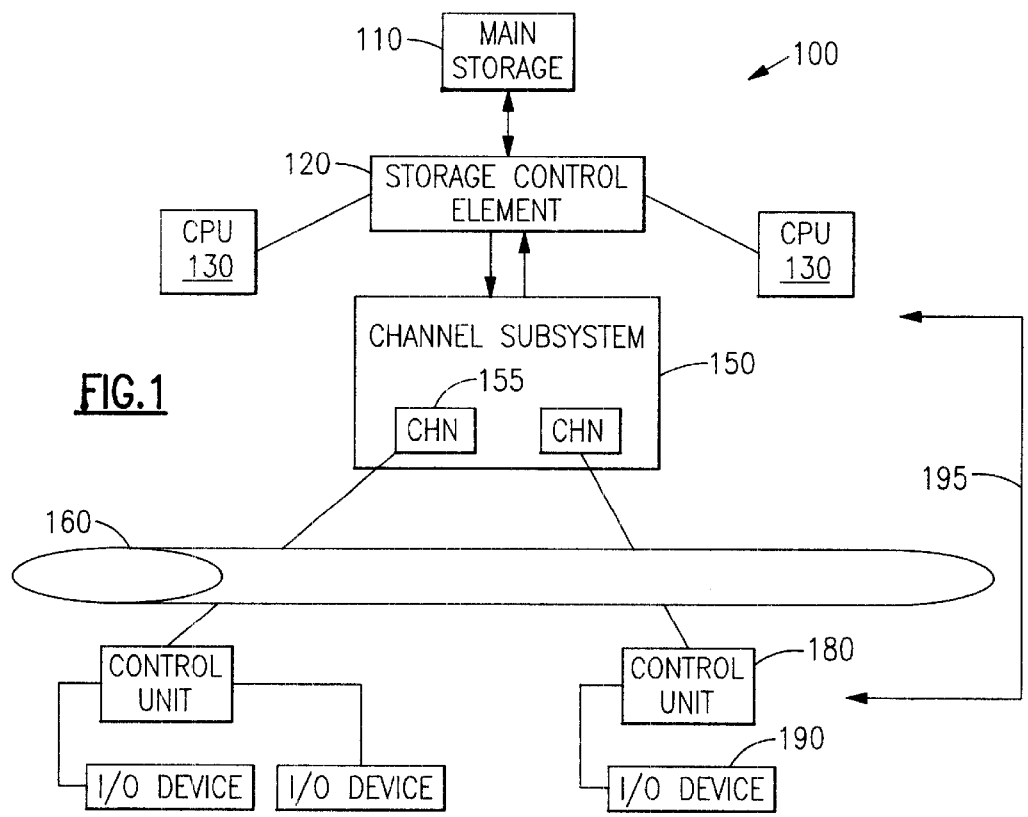
FIG. 1 is an illustration a network computing environment utilizing one embodiment of the present invention.

In a network computing system environment 100 having a data processing system architecture such as the one depicted in FIG. 1, information is passed between a program storage device or a main storage such as the one shown at 110, and one or more input/output devices (hereinafter I/O devices) 190, using channel subsystems 150. Through a fabric that can include one or more optical fiber and switches 160, channel paths are established, comprising channels 155 and one or more control units shown at 180. These channel paths are the communication links established between the I/O devices 190 and the main storage for processing and exchange of information. The channel subsystem, control units and the fiber are all part of an information transfer interface mechanism 195 which enables the main storage remain in processing communication with the input/output devices. The information transfer interface mechanism can include other or different components. The fabric can be to simply replaced by one or more switches. In one embodiment of the present invention, the interface mechanism does not even include the fabric or any switches.

The main storage 110 stores data and programs which are input from I/O devices 190. Main storage is directly addressable and provides for high speed processing of data by central processing units and one or more I/O channel subsystem devices. One example of a main storage is a customer's storage area and a system area (not shown). I/O devices 190 receive information or store information in main storage. Some examples of I/O devices include magnetic-tape units, direct-access storage devices (DASD), displays, keyboards, printers, teleprocessing devices, communication controllers and sensor-based equipment.

The main storage is coupled to the Storage Control Element (SCE) 120 which in turn is coupled to one or more central processing units (CPU) 130. The central processing unit(s) is the control center of the data processing system and typically comprises sequencing and processing facilities for instruction execution, initial program loading and other related functions. The CPU is usually coupled to the SCE via a bi-directional or uni-directional bus. The SCE, which controls the execution and queuing of requests made by the CPU and channel subsystem, is coupled to the main storage, CPUs and the channel subsystem via different busses.

The channel subsystem directs the flow of information between I/O devices and main storage and relieves the CPUs of the task of communicating directly with the I/O devices so that data processing operations directed by the CPU can proceed concurrently with I/O processing operations. The channel subsystem uses one or more channel paths as the communication links in managing the flow of information to or from I/O devices. Each channel path consists of one or more channels, located within channel subsystem, and one or more control units. As can be seen in FIG. 1, it is also possible to have one or more dynamic switches or even a switching fabric (network of switches) included as part of the path, coupled to the channel(s) and the control unit(s). Each control unit is further attached via a bus to one or more I/O device(s).

The subchannel is the means by which channel subsystem provides information about associated I/O devices to the central processing units, the CPUs obtain this information by executing I/O instructions. The subchannel consists of internal storage that contains information in the form of a channel command word (CCW) address, channel path identifier, device number, count, status indications, and I/O interruption subclass code, as well as information on path availability and functions pending or being performed. I/O operations are initiated with devices by executing I/O instructions that designate the subchannel associated with the device.

The execution of input/output operations is accomplished by the decoding and executing of channel command words or CCWs by the channel subsystem and input/output devices. A chain of CCWs (input/output operations) is initiated when the channel transfers to the control unit the command specified by the first channel command word. During the execution of the specified chain of I/O operations, data and further commands are transferred between the channel(s) and the control unit(s). In one embodiment of the present invention, the CCWs are pipelined and the associated data is streamed to the Control Unit(s) meaning multiple commands and data are sent to the Control Unit without need for interlocked responses from the Control Unit.

Figure 2:
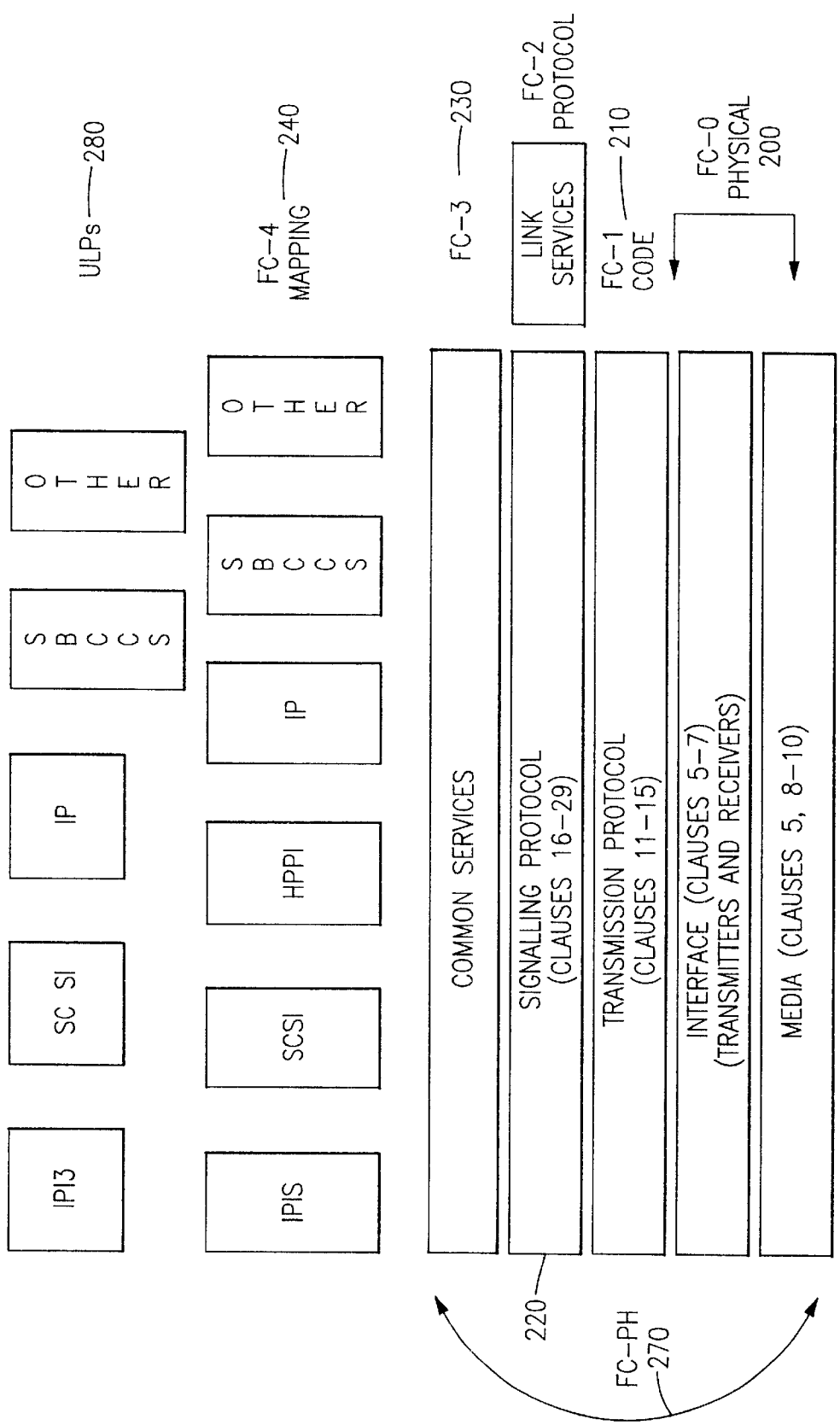
FIG. 2 is an illustration of different Fibre Channel hierarchies.

The present invention uses fiber optic channels to establish its channel path links and utilizes the beneficial features of fiber-based channels such as increased bandwidth, higher transfer rates and size advantages. FIG. 2 depicts an overview of the structure and concepts and mechanism used in the Fibre Channel interface (FC-PH) alluded to previously. The Fibre Channel (FC) is logically a bi-directional point-to-point serial data channel structured for high performance capability. Physically, the Fibre Channel can be an interconnection of multiple communication points, called N_Ports, interconnected by a switching network, called a Fabric, or a point-to-point link. Fiber is a general term used to cover all physical media supported by the Fibre Channel, such as optical fiber, twisted pair and coaxial cable.

Fibre Channel is structured as a set of hierarchical functions as illustrated in FIG. 2. Fibre Channel Physical and Signalling interface (FC-PH, 270) consists of related functions FC-0, FC-1 and FC-2 each of which is described as a layer or a level. As shown in FIG. 2, FC-0 200 defines the physical portions of the Fibre Channel including the fiber, connectors, and optical and electrical parameters for a variety of data rates and physical media. Coaxial cable and twisted pair versions of the Fibre Channel are defined for limited distance applications. FC-0 provides the point-to-point physical portion of the Fibre Channel and a variety of physical media is supported to address variations in cable plants. FC-1 210 defines the transmission protocol which includes the serial encoding, decoding, and error control. FC-2 220 defines the signalling protocol which includes the frame structure and byte sequences. FC-3 230 defines a set of services which are common across multiple ports of a node. FC-4 240 is the highest level in Fibre Channel standards set and defines the mapping between the lower levels of the Fibre Channel and the Intelligent Peripheral Interface (IPI) and Small Computer System Interface (SCSI) command sets, the High-Performance parallel Interface (HIPPI) data framing, IP and other Upper level Protocols (ULPs) 280.

There are also three classes of service associated with FC's. Class 1 is a service which establishes dedicated connections, that is once a connection is established it is retained and guaranteed by the fabric. This service guarantees maximum bandwidth available between two N_Ports. Class 2 service is a connectionless service with the fabric multiplexing frames at frame boundaries. Class 3 is also a connectionless service with the fabric multiplexing frames at frame boundaries but class 3 supports only unacknowledged deliveries.

The present invention uses FC-0, FC-1 and FC-2 layers as transport for a higher layer FC-4. The present invention also utilizes the FC-2 capability for time division multiplexing of multiple exchanges over the same fiber optic link. Multiple exchanges, in this case, means multiplexing multiple channel programs at the same time with different devices. Taking advantage of this capability in prior art was not feasible. Hence the prior art required the dedication of a given channel to a particular channel program whereas the present invention enables interleaving multiple channel program starts to separate devices on one channel.

Figure 3:
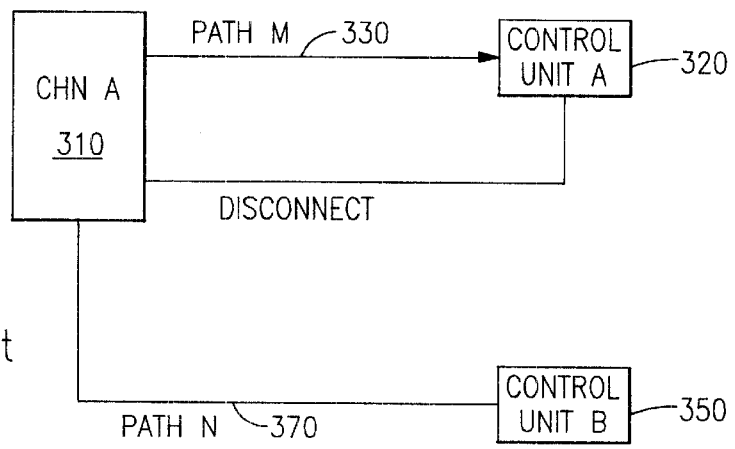
FIG. 3 is an illustration of prior art systems demonstrating communication paths.

Existing systems use a dedicated channel to communicate with the control unit. FIG. 3 depicts the prior art example. Normally the channel A 310 establishes processing communication with control unit A 320 along path M 330. In order for channel A to establish processing communication with control unit B 350, however, channel A has to end processing communications with control unit A, wait for a disconnect from control unit A and then establish processing communication with control unit B along path N 370. Each channel, in other words, can be in communication with one control unit at a time.

There are several advantages associated with using the present invention. 1) Multiple control units can concurrently access and remain in processing communication with the subsystem. 2) By multiplexing while pipelining and data streaming, the number of sequences required to execute typical I/O operation is reduced. 3) Many functions previously handled by the channels are now delegated to the control units for processing and issuance. 4) By interleaving multiple starts each to a separate device on one channel and pipelining the CCWs and streaming the associated data to the control unit, which in turn has enhanced functionality for processing and issuance, combined commands and data are sent to the control units without need for interlocked responses from the Control Unit.

The combination of the foregoing features eliminates the need for many functions which had been required in prior art systems. For example, in the present invention most command responses from the Control Unit to the channels are eliminated and command and data may be combined into a single sequence. Furthermore, all intermediate status sequences for chained CCW commands are eliminated. Command re-execution for some commands may be performed at the control unit rather than being initiated by the channel. By allowing several control units to concurrently access the subsystem, the need for most disconnect and reconnect sequences are also eliminated.

The present invention provides major changes in the following areas; each of which will be discussed separately:

a) initiation of channel programs;
b) execution of channel programs;
c) CCW and data pacing
d) incorrect length and chaining of flags;
e) interrupts and recovery—program controlled interrupts
f) Re-execution of search commands at the control unit;
g) Disconnects and reconnects;
h) channel program synchronization;
i) abnormal conditions at the channel;
j) residual count;
k) reset functions;
l) lost frames and framing structure;
m) pipelining of sequences to control unit;
n) class 2 and 3 log-ins and initialization;

I. Allowing Both Command and Data to be Combined into One Sequence

The writing of data from main storage and to I/O devices and the reading of data from I/O devices to main storage is accomplished by executing I/O operations. At start I/O time the channel builds the Fibre Channel sequence with the command and the command data if the command is a write. If the CCW count is greater than 4 k on a write CCW then each subsequent 4 K bytes of data are sent as a separate data sequence. Each Read CCW is sent as one sequence.

Read:

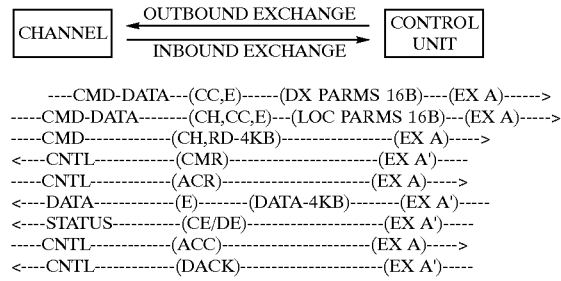

```
----CMD-DATA---(CC,E)------(DX PARMS 16B)----(EX A)------>
-----CMD-DATA--------(CH,CC,E)---(LOC PARMS 16B)---(EX A)----->
-----CMD--------------(CH,RD-4KB)------------------(EX A)---->
<----CNTL-------------(CMR)-----------------------(EX A')-----
-----CNTL------------(ACR)-----------------------(EX A)----->
<----DATA-------------(E)--------(DATA-4KB)--------(EX A')-----
<----STATUS----------(CE/DE)----------------------(EX A')-----
-----CNTL-------------(ACC)-----------------------(EX A)----->
<----CNTL-------------(DACK)----------------------(EX A')-----
```

EXAMPLE 1

READ—is an example for a Define Extend, Locate Record followed by a read CCW for one command chain.

Write:

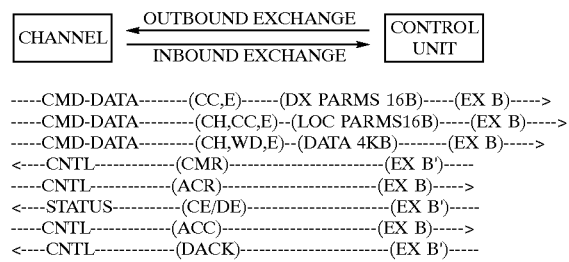

```
-----CMD-DATA--------(CC,E)------(DX PARMS 16B)-----(EX B)---->
-----CMD-DATA---------(CH,CC,E)--(LOC PARMS16B)-----(EX B)----->
-----CMD-DATA---------(CH,WD,E)--(DATA 4KB)--------(EX B)----->
<----CNTL-------------(CMR)-----------------------(EX B')-----
-----CNTL-----------(ACR)-----------------------(EX B)----->
<----STATUS----------(CE/DE)----------------------(EX B')-----
-----CNTL-------------(ACC)------------------------(EX B)----->
<----CNTL-------------(DACK)----------------------(EX B')-----
```

EXAMPLE 2

WRITE—This table is an example of a Define extend, Locate Record followed by a Write CCW.

EXAMPLE 3A

Multiple Reads and Writes

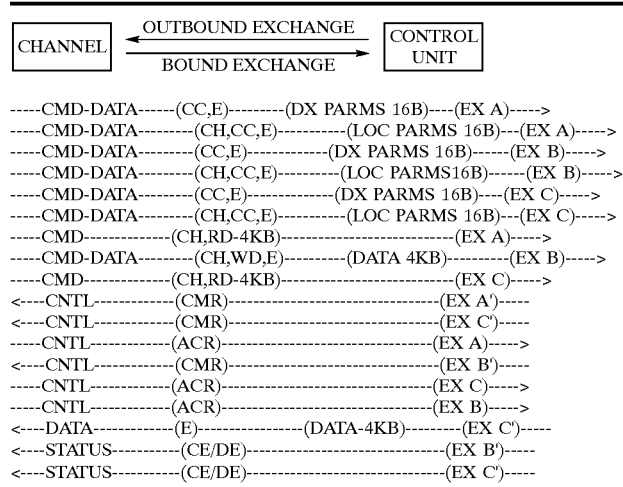

```
-----CMD-DATA------(CC,E)---------(DX PARMS 16B)----(EX A)----->
-----CMD-DATA---------(CH,CC,E)-----------(LOC PARMS 16B)---(EX A)----->
-----CMD-DATA---------(CC,E)-------------(DX PARMS 16B)------(EX B)----->
-----CMD-DATA---------(CH,CC,E)----------(LOC PARMS16B)-------(EX B)----->
-----CMD-DATA---------(CC,E)-------------(DX PARMS 16B)----(EX C)----->
-----CMD-DATA---------(CH,CC,E)-----------(LOC PARMS 16B)---(EX C)----->
-----CMD--------------(CH,RD-4KB)--------------------------(EX A)---->
-----CMD-DATA---------(CH,WD,E)----------(DATA 4KB)----------(EX B)---->
-----CMD--------------(CH,RD-4KB)--------------------------(EX C)----->
<----CNTL-------------(CMR)--------------------------------(EX A')-----
<----CNTL-------------(CMR)--------------------------------(EX C')-----
-----CNTL-----------(ACR)--------------------------------(EX A)----->
<----CNTL-------------(CMR)--------------------------------(EX B')-----
-----CNTL-------------(ACR)--------------------------------(EX C)----->
-----CNTL-------------(ACR)--------------------------------(EX B)----->
<----DATA-------------(E)----------------(DATA-4KB)---------(EX C')-----
<----STATUS----------(CE/DE)-----------------------(EX B')-----
<----STATUS----------(CE/DE)-----------------------(EX C')-----
```

-continued

```
-----CNTL------------(ACC)-------------------------------(EX B)----->
<----CNTL------------(DACK)------------------------------(EX B')----
-----CNTL------------(ACC)-------------------------------(EX C)----->
<----DATA------------(E)----------------(DATA-4KB)--------(EX A')----
<----STATUS----------(CE/DE)-----------------------------(EX A')----
<----CNTL------------(DACK)------------------------------(EX C')----
-----CNTL------------(ACC)-------------------------------(EX A)----->
<----CNTL------------(DACK)------------------------------(EX A')----
```

EXAMPLE 3A

Multiple Exchanges. This is an example of multiple command chains consisting of Define Extend, Locate Record, a read or a write in each CCW chain. The exchange ID is shown on each line. Each exchange is totally independent of any other exchange.

EXAMPLE 3B

WRITE Example, One CCW

```
Present Invention:

-----CMD-DATA-------(4K BYTES----------------------------->
-----CNTL-----------(CMR)---------------------------------->
<----CNTL-----------(ACR)----------------------------------
<----STATUS---------(CE/DE)--------------------------------
-----CNTL-----------(ACC) --------------------------------->
<----CNTL-----------(DACK)---------------------------------
Prior Art -----CMD-------------------------------------------->
     <----CNTL-----------(CMR)----------------------------
     -----CNTL-----------(ACR)--------------------------->
     -----DATA-------------------------(DATA 1KB)-------->
     -----DATA-------------------------(DATA 1KB)-------->
     -----DATA-------------------------(DATA 1KB)-------->
     -----DATA-------------------------(DATA 1KB)-------->
     <----STATUS---------(CE/DE)--------------------------
     -----CNTL-----------(ACC)--------------------------->
     <----CNTL-----------(DACK)---------------------------
```

EXAMPLE 3B

WRITE—Write Example, one CCW for present invention versus prior art.

```
Present Invention:

-----CMD-DATA--------(4K BYTES---------------------------->
-----CMD-DATA--------(4K BYTES---------------------------->
-----CNTL------------(CMR)-------------------------------->
<----CNTL------------(ACR)---------------------------------
<----STATUS----------(CE/DE)-------------------------------
-----CNTL------------(ACC) -------------------------------->
<----CNTL------------(DACK)--------------------------------
Prior Art -----CMD-------------------------------------------->
     <----CNTL-----------(CMR)----------------------------
     -----CNTL-----------(ACR)--------------------------->
     -----DATA-------------------------(DATA 1KB)-------->
     -----DATA-------------------------(DATA 1KB)-------->
     -----DATA-------------------------(DATA 1KB)-------->
     -----DATA-------------------------(DATA 1KB)-------->
     -----CMD------------(CC)----------------------------->
     <----STATUS---------(CE/DE)--------------------------
     <----CNTL-----------(CMR)----------------------------
     -----CNTL-----------(ACR)--------------------------->
     -----DATA-------------------------(DATA 1KB)-------->
```

-continued

```
     -----DATA-------------------------(DATA 1KB)-------->
     -----DATA-------------------------(DATA 1KB)-------->
     -----DATA-------------------------(DATA 1KB)-------->
     <----STATUS---------(CE/DE)--------------------------
     -----CNTL-----------(ACC)--------------------------->
     <----CNTL-----------(DACK)---------------------------
```

EXAMPLE 3C

WRITE—Write Example, two CCW for present invention versus prior art.

Abbreviation and Word Definitions

Following are definitions of abbreviations, used in the above examples.

| | | |
|---|---|---|
| 1. | CMR | Command Response |
| 2. | ACR | Accept-command-response function |
| 3. | B | Bytes |
| 4. | CC | Command Chaining |
| 5. | CH | CCW Command Chained into |
| 6. | Cmd | Command Type sequence |
| 7. | Cmd-Data | Command-Data Type sequence |
| 8. | Cntl | Control Type sequence |
| 9. | Data | Data Type sequence |
| 10. | Status | Status Type sequence |
| 11. | ACC | Status accepted |
| 12. | DACK | Device-level-ACK |
| 13. | CE | Channel-end status bit |
| 14. | DE | Device-end status bit |
| 15. | DX | Define Extent Command |
| 16. | LOC | Locate Record Command |
| 17. | E | End bit indicates the last data sequence |
| 18. | KB | Kilo-bytes |
| 19. | RD | Read Data Command |
| 20. | WD | Write Data Command |
| 21. | EX( ) | Exchange. At the FC-2 layer facilities exist that allow multiple operations to be running concurrently each with its own exchange ID. For system 390 this is used to run multiple concurrent I/O operations. |
| 22. | EX(') | The second exchange of an Exchange pair. Two exchanges are linked together at the FC4 layer. FC-2 architecture only allows one end or the other the ability to send frames at any one time. To get around this, an exchange pair is defined and bound together at the FC4 layer so that within an exchange pair frames can be sent by both sides at the same time, each using its own exchange ID. |

II. Fibre Channels and Information Units

As mentioned earlier, the present invention utilizes the FC-4 layer of Fibre Channel. Furthermore, the present invention utilizes the definition of an SB-2 information unit which includes information associated which is with the execution of an I/O operation and with the operation of a device. This information is transferred between the channel and control unit (as information units). The definition of the SB-2 FC-4 is based upon the FC-4 independent Information Unit construct described in FC-PH.

SB-2 Information Units (IUs) contain SB-2 device-level commands, status, data, or control information or SB-2 link-level control information. All SB-2 IUs are sent as FC-4 device-data frames. There are five basic SB-2 IU types that correspond to five of the FC-PH information categories. They are:

1. Unsolicited-command IU
2. Solicited-data IU
3. Unsolicited-data IU
4. Solicited-control IU
5. Unsolicited-control IU.

For brevity these IUs may be referred to respectively as the command IU, data IU, and control IU in the remainder of this document.

SB-2 IU Structure

The structure of SB-2 IUs is shown in Example 4 below.
FC-SB-2 general IU payload structure

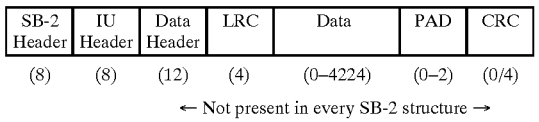

← Not present in every SB-2 structure →

EXAMPLE 4

IU Payload Structure

All SB-2 IUs contain the following:
1. Eight-byte SB-2 header
2. Eight-byte IU header.
3. Device-Information Block (DIB)." A DIB contains a minimum of 16 bytes; consisting of a 12 byte DIB header followed by four bytes of longitudinal-redundancy check (LRC).
4. Data Field. For certain DIB types, a variable length DIB data field may immediately follow the LRC. The maximum length of the DIB data field is 4224 bytes. Six different DIB types are defined; they are:
   a. Data DIB
   b. Command DIB
   c. Status DIB
   d. Control DIB
   e. Command-data DIB
   f. Link control DIB The type and structure of the DIB is determined by bits in the information unit identifier (IUI) field of the IU header. (See "Information-Unit Identifier.")

SB-2 Header

The SB-2 header is the first eight bytes of every IU.

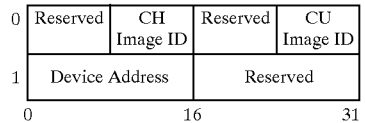

EXAMPLE 5

SB-2 Header

The SB-2 header provides the FC-4 addressing information needed to identify the logical path and the I/O device for which the exchange is being initiated. Bits 0–7 and 16–23 of word 0 and bits 16–31 of word 1 are reserved and set to zeros by the sender and ignored by the recipient.

CHANNEL IMAGE ID Bits 8–15 of word 0 contain the eight-bit ID of the channel image for which the exchange is being initiated.

CONTROL UNIT IMAGE ID Bits 24–31 of word 0 contain the 8-bit ID of the control-unit image for which the exchange is being initiated.

DEVICE ADDRESS When the AS bit in the IU header is set to one, bits 0–15 of word 1 contain the address of the device for which this exchange is being initiated.

IU Header

The information unit (IU) header is eight bytes, immediately following every SB-2 header and preceding the DIB header. The IU header provides SB-2 control flags and necessary information to associate an IU to a specific CCW.

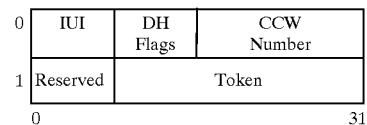

The IU header consists of four fields:
1. IUI field
2. Device Header (DH) flags field,
3. CCW number field
4. Token fields Byte 0 of word 1 is reserved and set to zero.

Information-Unit Identifier

Byte 0 of word 0 of the IU header is the information-unit identifier (IUI). The IU type and the functions that affect field formats and interpretation are identified by bits in the IUI, which has the following format:

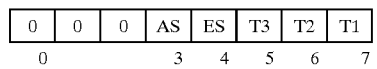

Bits 0–2 of the IUI are reserved and are set to zeros.

ADDRESS SPECIFIC (AS): The AS bit, bit 3 of the IUI, when set to one, indicates that the IU is associated with the specific device identified by the device-address field of the SB-2 header. When the AS bit is set to zero, the IU is not associated with a specific device, and the device address is not used.

SUPPLEMENTAL STATUS (ES): The ES bit is used to control the transfer of supplemental status. For a data IU containing a status DIB, the ES bit may be set to either one or zero. If the ES bit is set to one, supplemental status is present in the supplemental status field of the DIB. If the ES bit is set to zero, supplemental status is not present in the DIB.

DIB TYPE (T3,T2,T1): Bits 5–7 of the IUI define the type of DIB contained in the IU. The DIB type also determines the format of the DIB. Example 7 summarizes the setting of the T3-T1 bits.

| T3 | T2 | T1 | DIB Type | DIB Format |
|---|---|---|---|---|
| 0 | 0 | 0 | Data | Data |
| 0 | 0 | 1 | Command | Command Header |
| 0 | 1 | 0 | Status | Flags, status, count, supplemental status |
| 0 | 1 | 1 | Control | Control function and parameters |
| 1 | 0 | 0 | Command-Data | Command Header & Data |
| 1 | 0 | 1 | Link Control | Link Control Functions |

| T3 | T2 | T1 | DIB Type | DIB Format |
|----|----|----|----------|------------|
| 1  | 1  | 0  | Reserved |            |
| 1  | 1  | 1  | Reserved |            |

EXAMPLE 7

DIB-Type Settings
Device-Header Flags

Byte 1 of word 0 of the IU header is the device-header flags (DHF) field. The device-header flag bits are used individually or collectively to invoke certain SB-2 protocols to control the execution of an I/O operation. The format of the device-header flag field and the description of each of its flag bits follow. Bits 5–7 of the device-header flag field are reserved.

| E | EC | RDY | CH | EE | 0 | 0 | 0 |
|---|----|-----|----|----|----|----|----|
| 0 | 1  | 2   | 3  | 4  | 5  |    | 7  |

END (E) The E bit, bit 0, when set to one for either a command-data DIB or data DIB, is used to indicate that the data sent exactly satisfies the CCW count and that the CRC field is present in the DIB. Also, the E bit when set to one for a status DIB is used to indicate that the quantity of data sent by the channel with an early end indication (See "Early End (EE)."), exactly satisfied the record length. The CCW number and token in the IU header, collectively and in a model dependent manner, identify the CCW to which the E bit applies.

END CONNECTION (EC): The EC bit, bit 1, when set to one, for a status DIB, indicates that the control unit is logically disconnecting from the channel and requesting that the exchange pair be closed. When the EC bit is set to zero, the control unit, while still logically disconnecting from the channel, is requesting that the exchange pair remain open. The control unit then reconnects on the same exchange pair that was left open.

READY (RDY): The RDY bit is set to a one by the channel in the multipurpose control function, accept command response. For all other control functions, command IU's and data IU's the ready bit is meaningless and ignored.

CHAINING (CH): The CH bit, bit 3, when set to one, is used by the channel to signal its intention to chain or to confirm that chaining is continuing.: If the CH bit is set to one, the command IU is a command update as a result of either command chaining or data chaining and the DIB contains information from the current CCW. Whether the command update is for data chaining or command chaining is indicated by the DU bit in the command flag field. If the CH bit is set to zero, the command IU is not a command update. The CH bit is set to one by the channel when chaining is still indicated for the I/O operation and set to zero when chaining is not or no longer indicated for the I/O operation or when a retry request is not accepted.

EARLY END (EE): The EE bit, bit 4, when set to one for either the multi-purpose control function in a control DIB (See "Control End."), a data DIB, or a command-data DIB is used to indicate that the quantity of data sent for the CCW indicated by the CCW number is less than the CCW count specified for that CCW and for the data DIB and command-data DIB, the CRC field is present. If the EE bit is set to zero, an early end condition is not being indicated and the CRC field is not present in the DIB.

CCW Number: The CCW number, byte 2 and 3 of word 0, of the IU header contains two 8 bit binary values that are assigned by the channel to the CCW associated with the IU being sent. The left most 8 bits (high-order 8 bits) of the CCW number represent an 8-bit binary number that is assigned by the channel to each CCW which contains a command. The right most eight bits (low-order bits) of the CCW number represent a model-dependent value assigned by the channel to every CCW. This value, in combination with the high-order 8-bits of the CCW number identifies uniquely, every CCW executed by the channel.

Token

The token field, bytes 1–3 of word 1, of the IU header contains a 24-bit binary value that is provided by the channel. The value X'000000' is not a valid token and is used only in those IUs that do not require a valid token.

Device Information Block (DIB) Structure

A DIB consists of a DIB header, LRC, and for some DIB types a DIB-data field. The DIB type is identified by bits in the IU header. EXAMPLE 8 shows the DIB structure common to all DIB types.

| DIB Header | LRC | DIB Data |
|------------|-----|----------|
| (12)       | (4) | (0–4224) |

EXAMPLE 8

Basic DIB Structure
DIB Header

The DIB header is the first 12 bytes of every DIB type and immediately follows the IU header. The contents of the DIB header and the DIB data field are determined by the DIB type.

Example 9 shows the basic DIB structure common to all DIB types.

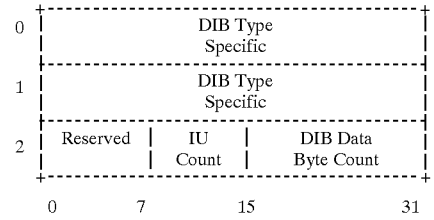

EXAMPLE 9

DIB Header Structure

The format and contents of the DIB header fields are described in later sections as well as they relate to those fields in a DIB that are common to more than one DIB type.

IU Count

Byte 1 of word 2, of each DIB header type contains the IU count. The IU count is an eight-bit binary number that is included in every IU sent during an open exchange.

The IU count value is initialized to X'00' when an exchange is opened and the first IU sent. The value of zero is inserted in the IU count field of the DIB header for the sequence sent to open an exchange. After each IU is sent the IU count is advanced by one and the new value included in the IU count field of the next IU sent. When the IU count reaches X'FF' and additional sequences are to be sent, the IU count is permitted to wrap and the next value used is X'00'.

DIB Data Byte Count

Bytes 2 and 3 of word 2, of the DIB header contain the DIB data byte count. The DIB data byte count is a 16 bit binary number that represents the number of bytes of data contained in the DIB-data field. Pad bytes and CRC are not included in the data byte count.

Longitudinal-Redundancy-Check Field

The longitudinal-redundancy-check (LRC) field contains a 32-bit redundancy-check code, immediately following the DIB header in bytes 28 to 31 of the 32 byte FC-4 header. LRC is provided only on the bytes consisting of the SB-2 header, IU header, and DIB header.

The LRC generator/checker is initialized to X'A55AA55A' before the header fields are processed a full word at a time.

DIB Data Field

The DIB Data field, if present, is a variable length field which contains either data, data and pad bytes, data and pad bytes and a CRC, or just a CRC.

The quantity of data contained in the DIB data field is indicated in the DIB-data count field of the DIB header. All DIB types can be sent with a DIB data field of zero bytes. A command DIB and a control DIB are always sent with a DIB data field of zero bytes. The maximum number of bytes that can be sent in the DIB data field is 4224 bytes.

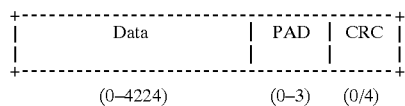

When the data field contains the maximum of 4223 bytes of data, the PAD field and CRC field both contain 0 bytes. When CRC is present in the DIB, the maximum number of bytes in the DIB data field is 4220.

Pad

Pad bytes, if present, are contained in the last word of the DIB data field and are used to pad the DIB data field to the next word boundary.

Cyclic-Redundancy-Check Field

The cyclic-redundancy-check (CRC) field, if present in an IU, contains a word-aligned 32-bit redundancy-check code. The CRC field is present in a command-data DIB, data DIB, status DIB, and link control DIB.

For a command-data DIB and a data DIB, the CRC field is present only when either the E bit or the EE bit in the device-header flags field is set to one. For a status DIB, the CRC field is present only when the supplement status (ES) bit is set to one. For a link control DIB containing a link payload, the CRC field is present only when the E bit is set to one.

The processing of CRC, in terms of generation and checking, follows the definition as provided in Annex N of the FIBRE CHANNEL, Physical and Signaling Interface (FC-PH). Additional information can be found in Fiber Distributed Data Interface (FDDI) Media Access Control (MAC) (ISO/IEC 9314-2:1989) appendix B. The initialized value of the CRC generator is X'FFFFFFFF'.

Command DIB Structure

A command DIB is sent only in a command IU by the channel. It is used to transfer information associated with the current CCW to the control unit. At the beginning of an I/O operation, a command IU containing a command DIB may be used to initiate an operation with an I/O device. When data chaining is performed, a command IU containing a command DIB may be used to update the information held about the current command at the control unit. Each command DIB contains a command header and LRC.

Command Header

The command header is the first 12 bytes of either a command DIB or command-data DIB. The command header has the following format:

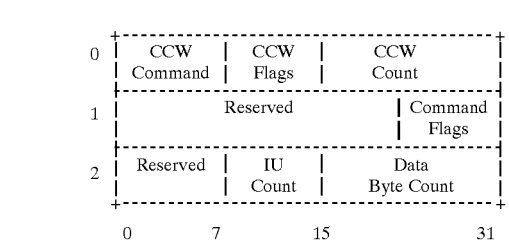

The command header contains both information from the current CCW and information supplied by the channel necessary for the control unit to execute the current command. The command header describes to the control unit how execution of the I/O operation being initiated is to be performed and additionally may also specify how a subsequent I/O operation is to be performed.

Bytes 0–2 of word 1 and byte 0 of word 2 are reserved and set to zero.

Command Field

Byte 0 of word 0 of the command header contains the command specifying the I/O operation to be executed with an I/O device. The basic operations are specified by the following commands: read, read backward, write, control, and sense.

When a command IU is used to update the count and flags during data chaining (the DU flag of the command DIB is set to one), the contents of the command field is unpredictable and is ignored by the control unit receiving the command IU.

CCW Flag Field

Byte 1 of word 0 contains the CCW flags. Bits 3 and 5–7 are reserved and are ignored by the control unit receiving the command IU. The value to which bits 3 and 5–7 are set is unpredictable. The format of the CCW flag field is as follows:

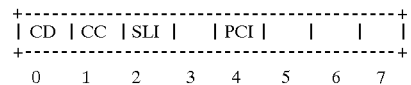

CHAIN DATA (CD): The CD flag, bit 0, when set to one, specifies an intent to perform chaining of data. It causes the CCW flags, CCW count, and command flags designated in the next command IU in which the DU flag and the CH bit are set to ones to be used with the current command.

CHAIN COMMAND (CC): The CC flag, bit 1, when set to one while the CD flag is set to zero, specifies an intent to perform chaining of commands. Upon normal completion of the current I/O operation and after receiving device end from the device, chaining of commands will cause the command code specified in the command header of the next command IU to be initiated.

SUPPRESS LENGTH INDICATION (SLI): The SLI bit, bit 2, controls whether or not command chaining is to occur on an incorrect-length condition. When the SLI bit is set to one and an incorrect-length condition exists for the current command, command chaining, if indicated, is permitted. If the SLI bit is set to zero and an incorrect-length condition exists for the current command, command chaining, if indicated, may or may not occur depending on the setting of the COC flag bit. If the COC flag bit is set to zero command chaining is not permitted and ending status with the residual count and appropriate status flag bits are transferred to the channel. (See "Continue on Command Immediate (COC).")

PROGRAM-CONTROLLED-INTERRUPTION (PCI): The PCI flag, bit 4, when set to one for the current command, causes the control unit to generate and transfer to the channel a PCI indication. The control unit indicates that it has started execution of a command with the PCI bit set to one by sending a command response IU or, only for the first command of the channel program that is executed as an immediate operation, a solicited data IU containing a status DIB. When a command response is received, the channel recognizes that the control unit has started execution of the CCW identified by the CCW number in the IU header. If the PCI bit is set to one in the identified CCW, the channel sub-system recognizes an intermediate interruption condition.

CCW Count Field : Bytes 2 and 3 of word 0 contain the byte count specified in the current CCW. The CCW count field is a 16-bit field indicating the number of bytes to be transferred between the channel and control unit during execution of the CCW. The field is interpreted as a 16-bit unsigned binary integer. The value in the field can range from 0 to 65,535.

Command-Flag Field : Byte 3 of word 1, contains the command flags. The channel uses the command flags to provide the control unit with additional information on how the I/O operation, specified by the contents of the CCW in the command header, is to be executed. Bits 0–2 are reserved, are set to zeros by the channel, and are ignored by a control unit. The format of the command flag field is as follows:

```
     0           3    4    5    6    7
```

DATA-CHAINING UPDATE (DU): The DU flag, bit 3, when set to one, indicates that the CC flag, the CD flag, and the count sent in this command IU are associated with a new CCW used during data chaining. The CH bit in the device header is set to one when the DU flag is set to one.

CONTINUE ON COMMAND IMMEDIATE (COC): The COC flag, bit 4, when set to one along with the CC flag also set to one indicates that suppression of the incorrect length condition is recognized by the channel and command chaining to the next command is permitted at the end of execution of a command immediate operation. When a control unit executes a command as an immediate operation and the CCW count for the command is nonzero, an incorrect length condition is recognized and command chaining, if indicated, is under control of the COC flag or SLI flag. If the COC flag or the SLI flag is set to one, command chaining, if indicated, is permitted. If the COC flag and the SLI flag are both set to zero, command chaining is not permitted. (See "Suppress Length Indication (SLI).")

SYNCHRONIZE RESPONSE (SYR): The SYR flag, bit 5, when set to one, indicates to the control unit that the command IU contains a command being sent in response to status received for the immediately preceding command. The channel may set the SYR bit to one only when the CH bit is set to one and the DU bit is set to zero in the command header. REPEAT EXECUTE (REX): The REX flag, bit 6, when set to one, indicates that the channel is requesting the control unit to perform the transfer-in-channel function by repetitively executing the command in the command header. The channel sets the REX bit for a command only when the CCW containing the command has the CC bit set to one, the CD bit set to zero, and the next CCW (the one to which chaining will occur) contains a transfer-in-channel command and an address of the previous CCW. When the control unit recognizes this indication, re-execution of the current command is performed until one of the following conditions occur:

1. Execution of the command results in status of other than channel end and device end alone being recognized.
2. Execution of the command has been performed 128 times.
3. Execution of the command is terminated by a cancel, selective reset, or system reset.

When an execution of the command results in status of channel end, device end, and status modifier alone being recognized, chaining to the next command occurs at the control unit.

When re-execution of the command is performed 128 times without status other than channel end and device end alone being recognized, re-execution of the command is terminated and the status recognized for the last execution of the command is sent to the channel.

When execution of the command results in status of other than channel end and device end alone or channel end, device end, and status modifier being recognized, re-execution of the command is terminated at the control unit and status is sent to the channel.

SYNCHRONIZE SEND STATUS (SSS): The SSS flag, bit 7, when set to one, indicates that the channel has recognized a condition requiring synchronization with I/O execution at the control unit and is requesting the control unit to generate and present status at the completion of the I/O operation for this command IU. In the case of normal completion and when channel-end status is not accompanied by device-end status, the control unit sends a status DIB containing device-end status when the I/O operation has been concluded at the device. The following are the conditions for which the channel sets the SSS flag to one for the current command:

1. The next command to be sent to the control unit is a NOOP without chaining.
2. The prefetch control bit is set to one, the synchronize control bit in the ORB is set to zero, the current command being sent to the control unit is for a write operation, and the next command to be sent to the control unit is for a read operation.
3. The SSS flag may be set to one depending on the setting of the prefetch control bit and conditions at the channel.

Command-Data DIB Structure

A command-data DIB is sent only in a command IU by the channel. It is used to transfer both information associated with the current CCW for write commands with a nonzero CCW count and all or some portion of the data associated with the command.

A command-data DIB contains a command header, LRC, and a DIB-data field. The format of the command header is the same as that of a command DIB. The DIB data field is a maximum of 4224 bytes. If the CCW count for the command is 4224 bytes or less, all of the data for the command is sent in the DIB-data field. If the CCW count for the command is greater than 4224 bytes, 4224 bytes are sent in the DIB-data field and the remaining data is sent in one or more data IUs.

The data byte count, bytes 2 and 3 of word 2, of the command header specify the number of data bytes contained in the DIB-data field. (See "DIB Data Byte Count.")

Data DIB Structure

A data DIB is sent only in a solicited data IU by either the channel or control unit. For a write operation, the channel uses one or more data IUs containing a data DIB to transfer any remaining portion of data not sent in the command-data DIB. When the quantity of data to be sent for a write operation exceeds the maximum number of bytes that can be sent in an IU, the channel sends a command IU containing a command-data DIB for the command and the maximum number of bytes allowed; followed by one or more data IUs until either the quantity of data specified by the CCW count is satisfied or an early end condition is recognized.

For a read operation, the control unit uses one or more data IUs containing a data DIB to transfer to the channel the data for the read command. When the quantity of data to be sent requires more than one data IU, the control unit sends a data IU followed by one or more additional data IUs until one of the following occurs: 1) the quantity of data specified by the CCW count is satisfied, 2) an early end condition is recognized, or 3) a condition requiring status to be sent is recognized. All data IUs contain the maximum number of bytes, 4224, except the last data IU sent for a CCW which may have fewer than 4224 bytes. When the last data IU for the current CCW contains more than 4220 bytes of data, CRC for the data can not be included in the data DIB and must be sent in a data DIB by itself. This data DIB containing the CRC is sent in a data IU following the last data IU containing data. The byte count is set to zero and the DIB data field contains only the four-byte CRC.

The CCW number and token provided in the IU header of each data IU sent is the same as that provided in the command IU.

Data Header

The data header is the first 12 bytes of a data DIB. The data header has the following format:

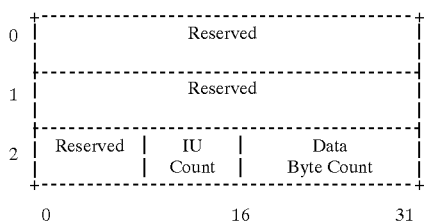

Word 0, word 1, and byte 0 of word 2 are reserved and set to zero by the sender and ignored by the recipient.

Status DIB Structure

A status DIB in a data IU is sent only in either a solicited data IU or unsolicited data IU by a control unit. It is used to transfer status, with or without supplemental status, to the channel. A solicited data IU containing a status DIB may be sent in direct response to a command IU, or certain control IUs with one of the following control functions specified: request status, accept command response, selective reset, and a cancel that initiates an exchange pair. Additionally, a solicited data IU containing a status DIB may be sent during the data transfer portion of an exchange.

An unsolicited data IU containing a status DIB is used to present asynchronous status or any status that initiates a connection and is not sent in direct response to an IU received from the channel.

After sending a data IU containing a status DIB, the control unit discards all command and data IUs associated with that device address and control unit image, either queued at the control unit, or received from the channel, with the SYR bit set to zero. Acceptance may be indicated explicitly when the control unit receives a status accepted IU or it may occur implicitly when the control unit receives a command IU with the SYR bit in the command header set to one. When any of the following conditions exist, status is sent to the channel at the completion of the current I/O operation at the control unit:

1. The SSS command flag bit is set to one.
2. The CC flag bit is set to zero
3. The first command of the channel program is executed as an immediate operation.
4. The CC flag bit is set to one and the SLI flag bit is set to zero and an incorrect length condition is detected.
5. The CC flag bit is set to one, both the SLI flag bit and COC command flag bit are set to zero, the CCW count is nonzero, and the command is executed as an immediate operation.
6. When the REX bit is set to zero, an status other than channel end (with or without device end) is recognized.
7. When the REX bit is set to one, and the command has been executed 128 times.
8. When the REX bit is set to zero, and status of channel end (with or without device end) is recognized, and conditions at the control unit require a disconnection from the channel to suspend the transferring of command IUs and data IUs.

If none of the above conditions exist, status is not sent and chaining at the control unit is permitted. Additionally, status is not sent if during an existing exchange any previously sent status has not yet been accepted by the channel.

Status Header

The status header is the first 12 bytes of a status DIB. The status header has the following format:

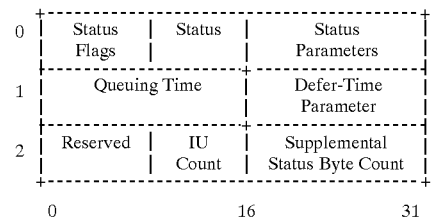

Status-Flag Field

Byte 0 of word 0 of the status header contains the status flags. The status-flag field is used to provide additional information to the channel concerning the conditions that were present at the control unit when status was generated and conditions that pertain to the status DIB. These flags assist the channel in determining how to handle the status DIB and what status, if any, to report. The status-flag field has this format:

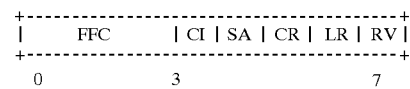

Flag-Field Code (FFC): The FFC, bits 0–2, is a three-bit encoded field that either in conjunction with or independent of the other status flag bits further describes the status information contained in the status byte or the status-parameter field or both. The flag-field code assignments are:

000 No Function. The status byte and status-parameter field are not affected by this FFC code.

001 Queuing Information Valid. The queuing time field contains control-unit queuing information. This code is set by the control unit and checked by the channel only during the presentation of device-end status during a reconnection for an I/O operation.

010 Resetting Event. A resetting-event condition exists for the logical path and the device for which unit-check status is being presented. This code is permitted only when unit-check status is presented for a resetting-event condition and then only as initial status in response to a command IU for the first command of the channel program.

011–111 Reserved.

CHANNEL INITIATED (CI): The CI bit, bit 3, when set to one, indicates that this solicited data IU containing a status DIB is in direct response to a control IU indicating selective reset with either a request for retry or a request for unit check.

SUPPLEMENTAL STATUS AVAILABLE (SA): The SA bit, bit 4, may optionally be used by the control unit to indicate that supplemental status associated with the current status is available. The SA bit is used only when unit-check status is indicated.

COMMAND RETRY (CR): The CR bit, bit 5, when set to one, is used to request command retry if the status byte also contains retry status.

LONG RECORD (LR) The LR bit, bit 6, when set to one, indicates that a long-record condition was detected by the control unit; that is, additional data would have been sent to the channel or written to the device beyond the data provided for the current command. The LR bit may be set to one by the control unit only when the channel-end status bit is set to one.

RESIDUAL-COUNT VALID BIT (RV) The RV bit, bit 7, when set to one, indicates that the status-parameter field contains the residual count. For write commands, the residual count is equal to the difference between the CCW count for the write command and the number of bytes actually written to the device. For read commands, the residual count is the difference between the CCW count and the number of bytes actually read from the device and transferred to the channel. The RV bit may be set to one by the control unit only when the channel-end status bit is set to one.

Status Byte: Byte 1 of word 0 contains the status byte. The status byte indicates device and control unit status. The status byte has this format:

| Status Bit Position | Description |
| --- | --- |
| 0 | Attention |
| 1 | Status modifier |
| 2 | Control-unit end |
| 3 | Busy |
| 4 | Channel end |
| 5 | Device end |
| 6 | Unit check |
| 7 | Unit exception |

For more information on status bits, see IBM ESA/390 Common I/O-Device Commands, SA22-7204.

Status-Parameter Field

The status-parameter field, bytes 2 and 3 of word 0 of the status header, is a 1 may contain either a residual count or a pacing parameter. The pacing parameter is provided in the status parameter field when status is presented for the first command of a channel program, or, when presenting device end in order to reconnect when the chaining condition is set. In the former case of presenting channel end plus device end status in response to an immediate command, the status parameter field contains the pacing parameter so this field is not available to carry the residual count. If the conditions are such that the pacing parameter is not present and the RV bit is set to zero, the control unit sets the status-parameter field to zero, and the channel receiving the status DIB ignores the status-parameter field.

RESIDUAL COUNT—The residual count is a 16-bit unsigned binary number that represents the difference between the CCW count for a command and the quantity of data actually transferred either from or to the device for that command. The residual count is always equal to or greater than zero.: For write commands, the residual count is equal to the difference between the CCW count of the write command and the number of bytes actually written to the device. For read commands, the residual count is the difference between the CCW count and the number of bytes actually read from the device and transferred to the channel. The residual count is meaningful only when the residual-count-valid (RV) bit is one.

Pacing Parameter

The pacing parameter is an eight-bit value that is carried in the least significant byte of the status parameter field.

The pacing parameter is set by the control unit to indicate to the channel the maximum number of IUs a channel may send per outbound exchange before it receives a command response IU which allows the control unit to allocate resources fairly among multiple channel programs that may be executing concurrently.

Queue-Time Parameter

Bytes 0 and 1 of word 1 contain the queue-time parameter (QTP). Queue time represents the time the I/O operation is queued at the control unit. When control unit queuing is provided, I/O operations specified by the channel program are executed up to a point where the I/O resources are unavailable to execute an I/O operation in that channel program (such resources would typically be in use executing I/O operations specified in other channel programs).

Defer-Time Parameter

Bytes 2 and 3 of word 1 contain the defer-time-parameter (DTP). Device- defer-time is accumulated by the control unit whenever ongoing channel program execution needs to be temporarily delayed because a device-dependent action needs to be performed.

Supplemental Status Field

Supplemental status, when present, provides additional information concerning conditions at the control unit or device for which status information is being provided. Supplemental status exists only for unit-check status. When supplemental status is included in a status DIB, it is sent in the supplemental-status field. When supplemental status is not included in the status DIB with its associated status information, the supplemental status is held by the control unit until it is retrieved or reset by the channel.

Control DIB Structure

A control DIB is sent only in a control IU by either a channel or control unit. It is used to transfer control information necessary for the execution of an I/O operation or for device-level recovery. The structure of the control IU and its DIB is shown in this application. The control DIB consists of a 12-byte control header and a four-byte LRC.

Control Header

The control header is the first 12 bytes of a control DIB. The control header contains information indicating the control function to be performed and, for some functions, the parameters needed to perform the specified function. The control header consists of a one-byte control-function field, a three-byte control-parameters field, IU count field, and reserved bytes. The format of the control header is as follows:

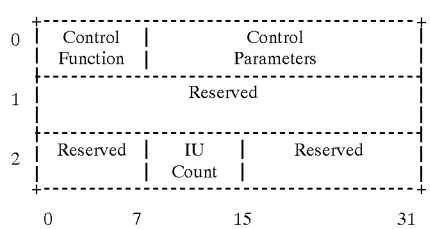

```
    0              7      15             31
```

EXAMPLE 10
Control Header

Word 1 and bytes 0 and 2–3 of word 2 are reserved and set to zeros by the sender and ignored by the recipient.

Control Function and Control Parameters

The first byte immediately following the IU header contain the control function, which is interpreted in conjunction with the bits in the device-header field of the IU header to determine the device-level function to be performed and the format of the control-parameter field. A summary of the functions represented by coding of bits 0–4 of the control-function field is shown in the following Example:

| Bits* | | | | | |
|---|---|---|---|---|---|
| 0 | 1 | 2 | 3 | 4 | Control Function |
| 0 | 0 | 0 | 0 | 0 | Multipurpose |
| 0 | 0 | 0 | 1 | 0 | Command response |
| 0 | 0 | 1 | 0 | 0 | Stack status |
| 0 | 0 | 1 | 1 | 0 | Cancel |
| 0 | 1 | 0 | 0 | 0 | System reset |
| 0 | 1 | 0 | 1 | 0 | Selective reset |
| 0 | 1 | 1 | 1 | 0 | Request status |
| 1 | 0 | 0 | 0 | 0 | Device-level exception |
| 1 | 0 | 1 | 0 | 0 | Status accepted |
| 1 | 0 | 1 | 1 | 0 | Device-level acknowledgment |
| 1 | 1 | 0 | 0 | 1 | Purge path |
| 1 | 1 | 0 | 1 | 0 | Purge path response |

EXPLANATION:
*All combinations of bits 0–4 that are not listed are reserved.

EXAMPLE 11
Summary of Device-Level-Control Functions

For all control DIBs, bits 5, 6, and 7 of the control-function field are set to zeros by the sender. The table in Example 12 provides a definition, in summary form, of the IUI bits and device-header flag bits for the various control functions. Control IUs are sent as either FC-2 solicited or FC-2 unsolicited control information categories. A control IU that initiates a connection is sent as an unsolicited control information category. A control IU that does not initiate a connection that is sent during an existing connection is sent as a solicited control information category. The sections following Example 12 describe each control function and any control parameters required.

| | IUI | | | | | | | | Device-Header Flag Bits | | | | | | | | | | Ctrl. |
|---|---|---|---|---|---|---|---|---|---|---|---|---|---|---|---|---|---|---|---|---|
| Control Fnctn | 0 | 1 | 2 | 3 AS | 4 ES | 5 T3 | 6 T2 | 7 T1 | 0 E | 1 EC | 2 RDY | 3 CH | 4 EE | 5 | 6 | 7 | From | F/M/L | Parm. Field |
| Multipurpose Accept cmnd response | 0 | 0 | 0 | 1 | Z | 0 | 1 | 1 | Z | Z | 1 | Z | Z | Z | Z | Z | CH | M | Z |
| Control End | 0 | 0 | 0 | 1 | Z | 0 | 1 | 1 | Z | Z | Z | Z | 1 | Z | Z | Z | CH | M | Z |
| Cmnd response | 0 | 0 | 0 | 1 | Z | 0 | 1 | 1 | Z | Z | Z | Z | Z | Z | Z | Z | CU | F/M | @ |
| Stack status | 0 | 0 | 0 | X | Z | 0 | 1 | 1 | Z | Z | Z | Z | Z | Z | Z | Z | CH | F&L/L | Z |
| Cancel | 0 | 0 | 0 | 1 | Z | 0 | 1 | 1 | Z | Z | Z | Z | Z | Z | Z | Z | CH | F/L | Z |
| System reset | 0 | 0 | 0 | 0 | Z | 0 | 1 | 1 | Z | Z | Z | Z | Z | Z | Z | Z | CH | F/L | Z |
| Seltve reset | 0 | 0 | 0 | Z | 0 | 1 | 1 | Z | Z | Z | Z | Z | Z | Z | Z | Z | CH | F/L | ó |
| Request stat | 0 | 0 | 0 | 1 | X | 0 | 1 | 1 | Z | Z | Z | Z | Z | Z | Z | Z | CH | F/M | Z |
| Device-level exception Address exception | 0 | 0 | 0 | 1 | Z | 0 | 1 | 1 | Z | 1 | Z | Z | Z | Z | Z | Z | CU | F&L/L | $ |
| Stat accepted | 0 | 0 | 0 | X | Z | 0 | 1 | 1 | Z | Z | Z | X | Z | Z | Z | Z | CH | F&L/M/L | Z |
| Device-lvl ack | 0 | 0 | 0 | X | Z | 0 | 1 | 1 | Z | X | Z | Z | Z | Z | Z | Z | CU | F&L/M/L | Z |
| Purge path | 0 | 0 | 0 | 1 | Z | 0 | 1 | 1 | Z | Z | Z | Z | Z | Z | Z | Z | CH | F | Z |
| Purge path response | 0 | 0 | 0 | 1 | Z | 0 | 1 | 1 | Z | Z | Z | Z | Z | Z | Z | Z | CU | F&L | Z |

EXPLANATION:
@ Includes pacing parameters in control-parameter field
ó Includes modifier bits in control-parameter field
$ Includes exception code in control-parameter field
F Start new exchange pair. (First IU of exchange pair.)
M Middle IU of exchange. (Exchange pair remains.)

-continued

| | IUI | | | | | | | | Device-Header Flag Bits | | | | | | | | | | Ctrl. |
|---|---|---|---|---|---|---|---|---|---|---|---|---|---|---|---|---|---|---|---|
| Control Fnctn | 0 | 1 | 2 | 3 AS | 4 ES | 5 T3 | 6 T2 | 7 T1 | 0 E | 1 EC | 2 RDY | 3 CH | 4 EE | 5 | 6 | 7 | From | F/M/L | Parm. Field |

L Last IU of exchange-exchange pair removed.
F&L Both first and last IU of exchange.
F/M/L First, Middle, or Last sequence of exchange.
CH Channel sends IU to control unit.
CU Control unit sends IU to channel.
X Bit is set to one or zero as appropriate for conditions
Z Bit or field is always set to zero by the sender and is ignored by the recipient.
0 Bit is always set to zero and is checked for zero.
1 Bit is always set to one and is checked for one.

EXAMPLE 12

Summary of Control IUs

Multipurpose Control Function

The multipurpose control function is used to perform a device-level control function that is determined solely by the device-header flag bits, in conjunction with the context in which the IU is received. The following functions are indicated by a multipurpose control function:

1. Accept command response
2. Control End

For a multipurpose control function, the control parameter field of the control header is set to zero by the sender. The setting of the bits in the IUI field and the device-header flag field depend on the function being indicated by the multipurpose control function and the context in which it was received. The following are descriptions of the different control functions that can be indicated using the multipurpose control function:

Accept Command Response

When the channel uses a multipurpose control function in response to a command response for the first command of the channel program, the channel is indicating that the command response is accepted and the control unit can proceed with execution of the I/O operation. For brevity, the multipurpose-control function when used in this way is referred to as an accept command response and a control IU indicating accept command response is referred to as an accept-command-response IU.

CONTROL END: The channel uses the multipurpose control function with the EE bit set to one, to indicate control end as the result of the channel being unable to perform a command update for data chaining. For brevity, the multipurpose control function when used in this way is referred to as a control end and a control IU indicating control end is referred to as a control-end IU.

The AS bit is always set to one for a control-end IU.

When the channel sends a control-end IU, it is indicating that, as a result of an abnormal condition, the transfer of the command update for data chaining was suppressed at the channel and that no more data will be sent for the current write operation. A control-end IU sent by the channel requires a status response from the control unit. The sending of additional IUs by the channel is held in abeyance until the required response is received.

A control unit that receives a control-end IU continues to execute the write operation with the device until the conditions for ending an I/O operation are met and then it transfers status to the channel. The status DIB carries the residual count for the current CCW being executed when the control end IU was received.

A control-end IU requires both a valid CCW number and valid token. The CCW number used is the value the channel would have sent in the command update had it been able to perform the data chain. The token assigned is model dependent.

Command Response

A control unit uses a command-response function to indicate that a command IU it received has been accepted for execution. For brevity, a control IU indicating command response is referred to as a command-response IU. A command-response IU is sent only by a control unit. A control unit sends a command response IU only under the following conditions:

When the control unit intends to start execution of the first command of the channel program and it is to be executed as a non-immediate command.

When the control unit has started execution of a command, other than the first command of the channel program, for which the PCI bit in the command header is set to one.

A command response IU always requires a valid CCW number and token, which is the CCW number and token received with the command for which the command response is being sent When the command response IU is sent in response to the first command of a channel program, the least significant byte of the control parameters field contains the eight-bit pacing parameter. (See "Pacing Parameter.")

Stack Status

The channel uses the stack-status function to indicates that status is not accepted. The control unit or I/O device is to hold the status information (status flags, status byte, and status parameter) and associated supplemental status, if any, until the status is requested by a request-status IU, until the status is presented as the response to a command IU, or until the status information is cleared or withdrawn. For brevity, a control IU indicating stack status is referred to as a stack-status IU.

Cancel IU

The channel uses the cancel function to cause the control unit to terminate or nullify the current I/O operation, if any, for the specified device. (See "Cancel Function.") For brevity, a control IU indicating cancel, is referred to as a cancel IU.

A cancel IU is sent only by the channel and when recognized by a control unit the response sent is a DACK.

A cancel IU requires a valid token but does not require a valid CCW number.

System Reset

The channel uses the system reset function to cause the control unit and associated devices to be reset with respect to the logical path on which the function was received. (See "System-Reset Function.") For brevity, a control IU indicating system reset is referred to as a system-reset IU.

A system reset IU is sent only by the channel and when recognized by the control unit the response sent is a DACK.

A system reset IU requires a valid token but does not require a valid CCW number. The CCW number field for a system reset IU is meaningless and not checked. The token field for a system reset IU is not checked by the recipient. The token value received in the system reset IU, is returned in the DACK response.

Selective Reset

The channel uses the selective-reset function to cause the control unit to end execution of the current operation, if any, for the specified device, and, depending on the bits within the control-parameter field, to perform one of the following functions:

Selective reset

Channel-initiated retry

Channel-initiated unit check

A selective reset IU is sent only by the channel.

Request Status

The channel uses the request-status function to indicate that the channel is prepared to have status information presented for the addressed device for which status is pending. (See "Stacking Status Function" and "Request-Status Function.") For brevity, a control IU indicating request status is referred to as a request-status IU.

A request-status IU is sent only by the channel. The AS bit is set to one in a request-status IU.

Device Level Exception

A control unit uses the device-level-exception function to indicate that an abnormal condition was recognized in the IU received for which the sending of status is inappropriate or not permitted. The abnormal condition is indicated by the exception code present in the first byte of the control-parameter field. For brevity, a control IU indicating device-level exception is referred to as a device-level-exception IU.

A device-level-exception IU is sent only by a control unit.

Status Accepted

The channel uses the status-accepted function to indicate that the status received in a status DIB was accepted. For brevity, a control IU indicating status accepted is referred to as a status-accepted IU.

A status-accepted IU is sent only by the channel and when recognized by the control unit the response sent is a DACK.

Device-Level Acknowledgment (DACK)

A control unit uses a device-level acknowledgment (DACK) function to indicate acceptance of a stack-status IU, cancel IU, system reset IU, selective reset IU, request-status IU, or status-accepted IU and that the requested function was or will be performed. For brevity, a control IU indicating a device level ACK is referred to as a DACK IU.

A device level acknowledgment is sent only by a control unit.

A DACK IU sent in response to a request-status IU which initiated a connection indicates that the requested function was or is to be performed. If the channel recognizes a DACK IU in response to a request-status IU which does not initiate a connection, the channel detects a device-level protocol error.

Purge Path

A channel uses the purge path function as part of device-level recovery in order to purge the transmit-receive path of any residual IUs associated with the logical path and device for which recovery is being performed. For brevity, a control IU indicating purge path is referred to as a purge path IU.

A purge path IU is sent only by a channel and when recognized by a control unit the response is a purge path response IU.

A purge path IU requires a valid token but does not require a valid CCW number. The CCW number field for a purge path IU is meaningless and not checked. The token value received in the purge path IU is returned in the token field of the purge path response IU.

A purge path IU is sent as the first sequence of an outbound exchange as an unsolicited control FC-2 information category.

Purge Path Response

A control unit uses the purge path response function to indicate receipt and recognition of the purge path function. For brevity, a control IU indicating purge path response is referred to as a purge path response IU.

A purge path response IU is sent only by a control unit in response to a purge path.

A purge path response IU is sent as a solicited control FC-2 information category, and is sent as the first and last sequence of the exchange.

Link-Control DIB Structure

A link-control DIB is sent in a control IU by the channel or control unit. It is used to transfer SB-2 link-level information. A control IU containing a link-control DIB is referred to as a link-control IU. A link-control IU is used to perform the following link-level functions:

establish a logical path, remove a logical path, exchange ID, test initialization, and to transfer incident information.

A link-control DIB contains a link header, an LRC, and for some functions a link payload with its associated CRC.

Link Header

The link header is generated by the channel or a control unit and it appears immediately after the IU header of either a solicited or unsolicited control IU. The link header contains information indicating the link-control function to be performed and, for some functions, the parameters needed to perform the specified function. The link header consists of a one-byte link-control-function field, a two-byte link-control-information field, a one-byte IU count, a two-byte link payload byte count, and reserved bytes. The format of the link header is as follows:

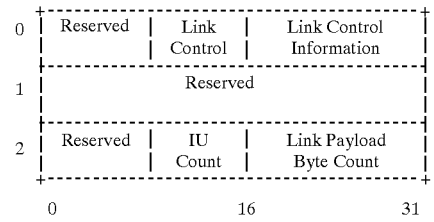

EXAMPLE 13

Link Header

Byte 0 of word 0, word 1, and byte 0 of word 2 are reserved and set to zero.

A link-control function when sent as a request by the channel requires a valid token and when sent as a request by a control unit, the token value is meaningless and not checked by the channel. A link control response sent by a control unit uses the token and CCW number from the IU to which it is being sent in response. A link control response sent by a channel does not use the token and CCW number from the IU to which it is being sent in response.

Link-Control Information

The link-control information field, bytes 2 and 3 of word 0, contain additional parameters necessary in order to perform the link-control function specified by bits 0–4 of byte 1 of word 0. The parameters are determined by the link-control function specified.

The parameters associated with a link-control function are contained in the first byte of the link-control information field, byte 2 of word 0. The second byte of the link-control information field, byte 3 of word 0, is always set to zero.

Link Payload

The link payload is a variable length field with a maximum length of 4220 bytes.

III. Device-Level Functions and Protocols

This section describes the functions and protocols necessary for the execution of an I/O operation and the exchange of control information. These functions depend on the successful completion of all FC-PH protocols.

A. Device-Level Operations

Initiation of an I/O operation, the transfer of data, and the ending of an I/O operation are device-level operations which rely on SB-2 device-level functions and protocols. The device-level functions discussed in this section have all been defined in "SB-2 Information Units." This section describes how these functions are used in order to perform device-level operations.

B. Channel Program Execution

A channel may concurrently execute one or more channel programs on the same or different logical paths. Each channel program executed by a channel is for a different device and requires a different exchange pair to be used. The number of channel programs that may be concurrently executed by a channel is model dependent.

Notes

1. The fetching of CCWs for the purpose of initiating multiple I/O operations with a device requires that the prefetch control (P) bit in the ORB be set to one.
2. When the channel fetches from storage and sends to the control unit the information contained in a CCW, that CCW is considered the current CCW at the channel. This process is referred to as the execution of the current CCW.
3. CCWs that are executed by the channel with the sending of a command IU to the control unit are considered active at the channel until an indication is received that CCW has been executed at the device. The term "active" in this case means that the channel must be capable of making that CCW current again. Once the channel has received a positive indication that a CCW has been executed at the device, that CCW can be retired and considered no longer active.
4. The CCW number assigned to a CCW that is considered no longer active at the channel may be reassigned.

C. Initiating an I/O Operation

An I/O operation is initiated with an device when the channel transfers the command from the current CCW to that device. The command is transferred in the command header of a command IU. (See "Command Header.") A channel executing a channel program may concurrently initiate multiple I/O operations with the same device. Each I/O operation consists of the transfer of a command in a command IU containing either a command DIB or a command-data DIB and, in the case of a write operation with a nonzero CCW count, the transfer of data in a data IU. A control unit that receives one or more command IUs, each initiating an I/O operation, executes each command in the order in which it is received from the channel. Execution of the command first requires acceptance of the command at the control unit. When a command is accepted, that command is considered current at the control unit until execution at the device is considered completed.

Data-Transfer Protocol

Data is transferred between the channel and the control unit as part of the execution of an I/O operation. The transfer of data from the channel to the control unit is a write operation. The transfer of data from the control unit to the channel is a read operation. The operation, read or write, is determined by the current command. Read commands have bit 7 of the command byte set to zero, and write commands have bit 7 of the command byte set to one.

Some read and write commands do not result in the transfer of data. These commands are executed as immediate operations, are designed to be executed without transferring data, have counts of zero in the CCW, or have data-record lengths of zero. (See "Initiating an I/O Operation" for the protocols used when the command is executed by the control unit as an immediate operation. See "Zero CCW Count" for the protocols used when the CCW count is zero.)

When, for first command of a channel program with a nonzero CCW count, the data-record length at the control unit is zero but the command is not accepted as an immediate operation, a command response IU is sent to the channel. Following receipt of the accept command response, status containing channel end with or without device end is sent to the channel, the residual-count-valid bit is set to one, and the residual count field contains the CCW count received with the command. For this case, if the command is a read command, no data is transferred to the channel. If the command is a write command and data was sent with the command, the data is discarded by the control unit. When, for a command other than the first command of a channel program with a nonzero CCW count, the data record length at the control unit is zero, a command response IU is sent to the channel only if the PCI flag is set to one for the command. If conditions at the control unit require the sending of status to the channel, status is sent after any command response that may be required. In this case the residual counts and data transfer rules for the first command of a channel program apply. If the conditions at the control unit do not require the sending of status and chaining is to take place at the control unit, only a command response, if requested is sent; otherwise nothing is sent to the channel.

Data is transferred from the channel to the control unit in a command-data DIB sent in a command IU or data DIB sent in a data IU. Data is transferred from the control unit to the channel only in a data DIB. See "Command-Data DIB Structure" and "Data DIB Structure" for the maximum DIB sizes. The quantity of data transferred for an I/O operation is determined by the count in the CCW for the operation or the data required by the device for the current command, when less than the CCW count. For each CCW that results in a command IU being sent to the control unit, the CCW count is included in the command header. For a write operation, the CCW count is used by a control unit to determine the quantity of data to expect from the channel. For a read operation, the CCW count is used by the control unit to determine the quantity of data that can be sent to the channel. For both a read and write operation the CCW count is used by the control unit to determine the residual count to be returned to the channel, if status is to be presented, and it is used in conjunction with the CCW flags and command flags, to determine if chaining is to occur.

Write Operation

A write operation is the transfer of data from the channel to the control unit as part of the execution of a command that has bit 7 set to one.

For a write operation with a nonzero CCW count, the channel sends the command and the data for the command in a command data DIB. If the quantity of data specified by the count for the current CCW exceeds the maximum allowable DIB size (see "Command-Data DIB Structure"), the remaining data is sent in data DIBs (see "Data DIB Structure") until all of the data specified by the CCW count is sent. If all of the data specified by the CCW count is sent, the E bit is set to one in the last IU sent containing the CRC. If all of the data specifies by the CCW count is not sent, the EE bit is set to one in the last IU sent containing the CRC.

When, during a write operation, the channel is able to send some but not all of the data for a CCW, the EE bit is set to one in the last IU sent. The channel, for the affected channel program, suspends sending IUs to the control unit until status is received.

When status is received, the channel may or may not resume execution of the channel program with the control unit, depending on the contents of the status DIB and conditions at the channel.

When, during a write operation, the channel is unable to send any of the data specified for a CCW, the EE bit is set to one for the command data DIB, the command header contains the required information for the CCW, and only the initialized value of the CRC generator is sent in the DIB data field.

When, for a write operation, the quantity of data required by a device is equal to or greater than the CCW count, the resulting residual count is zero. If the quantity of data required by the device is less than the CCW count, the resulting residual count is the difference between the data required and the CCW count.

When, at the end of a write operation, status including channel end is sent to the channel, the residual count calculated is included in the status DIB. If the quantity of data required by the device, is greater than the CCW count the LR status flag is also set to one to indicate that the device would have used more data had it been provided.

When the quantity of data received by the control unit for a write operation is less than the quantity specified by the CCW count and the EE bit is set to one in the last IU received, the I/O operation is executed and the data received, if any, is used by the device.

If the quantity of data required by the device is exactly equal to the quantity of data received, the E bit is set to one for the status DIB sent. If the quantity of data required by the device is either less than or greater than the quantity of data received, the E bit is not set to one for the status DIB sent; CRC is checked on the entire amount of data received.

Read Operation

A read operation is the transfer of data from the control unit to the channel as part of the execution of a command that has bit 7 set to zero. For a read operation the channel sends the command to the control unit in a command DIB in a command IU. The CCW count and CCW flags for the command are included in the command header.

When, for a read operation, the quantity of data sent to the channel exactly equals the count for the current CCW, the resulting residual count is zero and the E bit is set to one in the last data IU sent for that CCW.

If the quantity of data sent to the channel is less than the count for the current CCW, the resulting residual count is the difference between the quantity of data sent to the channel and the CCW count and the E bit is set to zero and the EE bit is set to one in the last data IU sent for that CCW.

If the control unit would have transferred more data to the channel had a larger count been provided or data chaining indicated, the resulting residual count is zero and the E bit is set one in the last data IU sent for that CCW.

When, at the end of a read operation, status including channel end is sent to the channel, the residual count calculated is included in the status DIB. If the quantity of data sent to the channel by the device, is exactly equal to the CCW count but the device would have sent more data had a larger CCW count been provided, the LR status flag is also set to one.

Data Chaining

When there are successive CCWs to be executed by the channel for a single I/O operation, the execution of these CCWs is referred to as data chaining. When each CCW associated with a channel program becomes the current CCW being executed, the channel indicates to the control unit the initiation of a data chaining operation by transferring a command-IU containing the chain-data flag, CCW count, and other flags associated with the CCW. Subsequent IUs containing data DIBs may also be transferred, either by the channel or control unit, depending upon whether input or output was specified in the command IU initiating the I/O operation.

When execution of the current CCW is completed and the chain-data flag is set to one, data chaining takes place, provided no abnormal conditions are detected and all other conditions for data chaining are satisfied.

Data chaining can occur only when the CD bit was set to one for the current CCW. When data chaining takes place, the command IU is used to update the flags and count held at the control unit, the chaining bit (CH bit) of the device header flag field and the data-chaining-update (DU) flag of the command-flag field are both set to ones.

If the control unit has received a command IU with the DU flag bit and the CH bit set to ones, if the control unit has the data-chaining condition set, and if the chain-data bit was set to one in the previous command IU, then the command flags and count from the command IU are accepted and become the current flags and count controlling the I/O operation.

The chain-data bit in the CCW-flag field of the command IU indicates there is a subsequent count and command-flag update for the device that will immediately follow the execution of the current command IU, provided that no abnormal conditions are encountered.

In some cases while data chaining, the channel may request the transfer of status when the last CCW of a data chain is executed. The channel does this by setting the SSS bit to one signalling the control unit to provide ending status in an IU containing a status DIB when the I/O operation has ended. In this case, if command chaining was set to one in the last CCW of the data chain, then normal command chaining would occur after the channel received the IU containing the status DIB. The control unit provides a status DIB if data chaining is ended and no further chaining is specified.

When data-chaining occurs at the channel during a write operation, a command IU with a command-data DIB containing the CCW count, required flags for the next CCW, and data is sent to the control unit. If the quantity of data specified for the CCW exceeds the quantity of data that can be sent in a command data DIB, one or more data DIBs may be sent. If the quantity of data sent for the CCW is exactly equal to the count in the CCW, the E bit is set to one in the last IU sent for the CCW. Data chaining continues until all of the data is transferred for the write operation or until the data chaining condition is not set at the end of a CCW. If the quantity of data sent for the CCW is less than the count in the CCW, the EE bit is set to one in the last IU sent for the CCW. For this case, data chaining, if indicated for the CCW, is not performed and execution of the channel program is suspended until status is received from the control unit. If the quantity of data used by the device is less than the total count provided by the channel, then a status DIB is sent; the residual count field indicates the amount of data which was not used. If the quantity of data required by the device is greater than the total count provided and the EE bit is not set, then status, if sent, has the LR bit set to one.

When, at the channel for a read operation, data chaining is indicated in the current CCW, a command IU with a command DIB containing the CCW count and required flags for the next CCW is sent to the control unit. The channel continues to do this for each CCW to which data chaining was specified until the command IUs for all of the CCWs for data chaining have been sent. For a read operation, the sending of the command IUs indicating data chaining does not constitute execution of the command or CCWs. The operation and data chaining is considered to have been initiated at the control unit. There is an indefinite period of time from the initiation of a read operation with data chaining and when data for that operation arrives at the channel.

When a data IU is received by the channel, the CCW number indicates the CCW for which this data is being sent. At that point in time, the CCW identified becomes current again at the channel and execution of the CCW is considered to be occurring. As each successive data IU is received for a read operation the channel ensures that the CCW number specified corresponds to the appropriate CCW. The quantity of data received for a CCW must exactly equal the CCW count for that CCW in order for data chaining to occur at the channel. If, before all of the data for a CCW is received, the next data IU received from the control unit specifies a different CCW than the current CCW for the read operation, a device-level protocol error is recognized. If either status or a data IU with the EE bit set to one is received, data chaining is ended for the current read operation. When, at the control unit for a read operations the quantity of data to be sent to the channel exceeds the CCW count in effect from the command IU currently being executed, the E bit is set to one in the last data IU sent for the CCW and if the data chaining condition is set, data chaining occurs at the control unit.

When data chaining occurs at the control unit, the next CCW goes into effect, that is, the contents of the next command IU with the CH bit set to one and a command DIB containing the DU flag set to one become current and go into effect for the read operation. The remaining data is sent in data IUs under the control of the new CCW. The CCW number from the current command IU is used in each data DIB sent, and the CCW count determines the maximum quantity of data that can be sent. Data chaining continues at the control unit until all of the data is transferred for the read operation or at the completion of the current CCW, the data chain condition is not set. If all of the data is transferred for the read operation and the data chaining condition is set, data chaining does not occur and status is sent to the channel. If all of the data has not been transferred to the channel for the read operation and the data chaining condition is not set, data chaining does not occur and a status DIB, if sent, contains the LR status flag bit set to one. The device ensures that data chaining is occurring at the proper times by recognizing a data-chaining condition. The data-chaining condition is recognized for each device and is used to verify that successive CCWs are being executed by the channel. The data-chaining condition is set whenever the device accepts a command IU and the chain-data bit is set to one in the command-flag field. The data-chaining condition is reset whenever a control IU is received and system reset, or selective reset, is performed; cancel or stack status is performed. The data-chaining condition is also reset whenever a command IU is received and the chain-data bit is set to zero, or status containing device end has been accepted by the channel.

When the data-chaining condition is set and the control unit initiates the ending of the I/O operation by transferring channel-end status to the channel, with or without device-end status, and if the quantity of data transferred is less than the CCW count, then the data-chaining indication is reset, and chaining is not performed. Data chaining occurs whenever the data-chaining condition is set, and the chaining (CH) bit in the device-header flag field and the data-chaining-update flag (DU flag) are both set to ones in the command IU. If the data-chaining condition is set in the control unit and if a command IU is recognized with the chaining bit (CH bit) or the data-chaining-update flag (DU flag) set to zero, then a device-level protocol error is detected.

If the data-chaining and command-chaining conditions are both not set and if a command IU is received with either the DU flag set to one or the CH bit set to one, then a device-level protocol error is detected. The CH bit and DU flag are tested before the data-chaining condition is changed to conform to the new value of the chain-data bit in the command-flag field. If the data-chaining condition is set, the control unit ensures that the path to the device remains available when the current count is exhausted, until the next command IU is recognized or until the data-chaining condition is reset.

Nullification Control During I/O Initiation

The present art has a protocol requirement that precluded the initiation of an I/O operation until the control unit receives notification from the channel that its status had been accepted for the first command of a channel program. This protection was needed for some devices to insure a proper level of recovery from errors occurring during the initiation phase of an I/O operation; however, this also generates a through-put performance penalty because initiation of I/O operations are delayed awaiting the channel signal. The penalty is primarily caused by internal channel delays in generating the response signal and in propagation delays. Further aggravating the situation is the fact that no software changes are allowed during the development of systems such as ESCON. Hence, the rule has to be enforced across ALL device types independent of whether or not the protection was necessary.

Under the instructions described in the present invention, the change restriction is relaxed allowing a finer granularity of control. This allows the incorporation of four concepts:

A) System software (Device Service Exit and Input/Output Supervisor) recognizing the set of devices not needing nullification protection.

B) A new control function defined in the subchannel and activated by system software (Device Service Exit) signaling the channel that nullification protection is not in effect for the respective subchannel.

C) A command, with appropriate parameter information, generated by System Software (Device Service Exit) and transferred by the channel advising the control unit that nullification protection is not in effect.

D) A set of defined protocol rules describing how the control unit is to function when nullification protection is not in effect.

D. Ending an I/O Operation

The ending of an I/O operation is either channel initiated or control-unit initiated. The channel may initiate the ending of an I/O operation as the result of an abnormal condition or a non-error condition. The control unit may initiate the ending of an I/O operation as the result of the completion of the execution of the command or the transfer of all data associated with the command or as the result of an abnormal condition detected during the execution of the command. When the channel initiates the ending of the I/O operation, it sends a control IU indicating one of the following control functions:

1. Cancel (see "Cancel Function.")
2. Selective reset (see "Selective-Reset Function.")
3. System reset (see "System-Reset Function.")

When conditions require that the control unit initiate the ending of the I/O operation with the channel, it sends status in a status DIB and discards all command and data IUs received subsequent to the current command. When conditions at the control unit permit the ending of an I/O operation without the transfer of status to the channel, the control unit starts execution of the next command. (See section "Status DIB Structure.")

In the absence of errors, when the current command is executed as a non-immediate operation, the control unit initiates the ending of the I/O operation when one of the following conditions is satisfied:

1. All of the data specified by the CCW count has been transferred and the data-chaining condition is not set.
2. The data required by the device for the command has been transferred.

When the current command is executed as an immediate operation, the control unit initiates the ending of the I/O operation when the conditions for the device allow channel-end status to be generated.

Ending an I/O operation without Transferring Status

When execution of the current command reaches completion with the device and the conditions at the control unit require that status not be presented to the channel, the I/O operation is considered to have ended and execution of the next command in the chain may proceed.

Ending an I/O Operation with Transferring Status

When the control unit ends execution of the current command, including the transfer of data, and the conditions at the control unit require status to be transferred to the channel, a status DIB indicating channel-end status is sent along with the appropriate status flags and residual count. If the operation is ended because of an abnormal condition, the control unit includes the appropriate status for this condition. The control unit may or may not include device end status. If device-end status is included, the operation is considered ended by the device when this status is accepted by the channel. If device-end status is not included, the I/O operation is considered ended by the device when the control unit later transfers device-end status and receives acknowledgment that the status has been accepted by the channel.

If unit-check status is included, the control unit can indicate that supplemental status is available by se ting the supplemental-status-available (SA) bit to one in the status DIB.

If the control unit is connected when it is ready to transfer status in order to initiate the ending of the I/O operation with the channel, a status DIB with channel end with or without device-end status is sent.

If the control unit is not connected when it is ready to transfer status in order to complete the ending of the I/O operation with the channel, a data IU containing a status DIB indicating device-end status is sent.

When, during an existing connection, conditions at the device require that channel-end status without device-end be sent and the chaining condition is set, the control unit may send a status DIB without device-end status and indicate whether or not the exchange pair should be left open.

If the control unit wants to request that the exchange pair be left open with the acceptance of this status, the EC bit in the IU header is set to zero; otherwise, the EC bit is set to one and the channel will initiate closing the exchange pair when status is accepted.

When the control unit indicates that it wants the exchange pair to remain open with the acceptance of status, the channel may or may not honor that request.

If the conditions to allow chaining are satisfied, the channel sends a status-accepted IU with the CH bit set to one and leaves the outbound exchange open, which is the signal to the control unit that its request has been honored. The control unit responds with a DACK IU leaving the inbound exchange open. If conditions at the channel do not allow chaining, the channel responds with a status-accepted IU and closes the outbound exchange, which signals the control unit that its request has not been honored and to close the inbound exchange with the sending of the DACK IU.

When the control unit's request to leave the exchange pair open has been honored by the channel, the device is considered to be no longer connected to the channel even though an active exchange pair still exists. Neither the control unit nor the channel is permitted to use this exchange pair for other operations or other devices.

When the control unit has device-end status for the device that was active on the exchange pair at the time of the disconnection, it is presented on this open exchange pair.

Supplemental Status

Supplemental status provides sense information in a status DIB to describe conditions at the control unit or device for which status information containing unit check is being provided. The control unit does not transfer supplemental status unless the channel has indicated its ability to accept it. The channel indicates whether it can accept status along with supplemental status when the channel sends a request-status IU. The supplemental-status (ES) bit, when set to one, indicates that the channel will accept supplemental status. When the ES bit is set to one in a request-status IU, the channel is indicating that it can accept a status DIB containing supplemental status as a direct response to the request-status IU.

Residual-Count

The control unit determines the residual count by calculating the difference between the CCW count and the actual number of bytes either written to a device or read from a device and sent to the channel. The value of the residual count is dependent on the CCW count, the number of bytes transferred between the channel and control unit, and the number of bytes actually read or written to the device. For a write operation the channel may transfer more data to the control unit than the device requires, but never more data than specified by the CCW count.

If the channel transfers all of the data specified by the CCW count to the control unit and all of the data is used by the device, the residual count is equal to zero for this command. If a write command with a nonzero CCW count is executed as an immediate I/O operation, the residual count is equal to the CCW count.

When, for a write operation, the device requires less data than specified by the CCW count, the residual count is equal to the difference between the CCW count and the actual number of bytes of data used. Alternatively, if the device requires more data than specified by the CCW count, the residual count is zero for this command. For the case where, for a write operation, the channel transfers less data than specified by the CCW count (see "Control End" and "Write Operation"), the residual count is still determined by calculating the difference between the CCW count and the actual number of bytes used by the device.

For a read operation the control unit transfers to the channel only a quantity of data equal to or less than the CCW count for the command. The residual count is the difference between the CCW count and the actual number of bytes sent. If the control unit transfers all of the data specified by the CCW count, the residual count is equal to zero for this command. If, a read command with a nonzero CCW count is executed as an immediate I/O operation, the residual count is equal to the CCW count. When, for a read operation, the control unit transfers less data to the channel than specified by the CCW count, the residual count is equal to the difference between the CCW count and the actual number of bytes sent. If, for the read operation, all of the data specified by the CCW count is sent but more data would have been sent to the channel had a larger count been specified, the residual count is equal to zero.

Note that there are only two cases in which the residual count is greater than zero:

1. when the record length is less than the CCW count, and
2. when, during a write operation, the channel is unable to send all of the data for a CCW and has set the EE bit in the last IU sent.

In the first case, the LR bit is set to zero, and in the second case the LR bit is meaningless. The following abnormal situations may require that the control unit set additional flags in the device header or may prevent the control unit from including a valid residual count in a status DIB:

1. The control unit sets the E flag to one in the device header for a status DIB only for a write operation involving an early end indication for which the amount of data received by the control unit and written to the device exactly equals the record length.
2. If an abnormal condition prevents the control unit from determining the exact amount of data either read from or written to a device, the control unit is unable to calculate a valid residual count. In this case, the control unit sets the RV bit equal to zero. It also indicates a unit check along with channel end status or it requests command retry. See definition of CR bit in Status section "Command Retry." If the channel accepts the command retry request, the retry proceeds normally. If command retry is not honored, the channel terminates the I/O operation. If the channel receives a status DIB with the channel-end status bit set to one, with the unit check bit set to zero, and with the residual count valid bit set to zero, the channel detects a device-level protocol error.
3. During a read operation, if an abnormal condition prevents the control unit from determining the exact amount of data transferred to the channel, then the control unit cannot calculate a valid residual count. In this case, it sets the RV bit equal to zero and indicates unit check along with channel end status. The control unit may also request retry as described above. During data chaining, the residual count from the current CCW is reset. When the next CCW takes effect, a new residual count is started for the data transfer associated with the new CCW. If a status DIB is sent as a result of the new CCW, it contains a valid residual count.

Command Chaining

When there are successive I/O operations to be executed by a channel and a control unit for a single channel program, the execution of these successive I/O operations is referred to as command chaining. When an I/O operation is initiated by the channel, it uses a command IU to transfer the command, CCW flags, CCW count, and command flags associated with the current CCW to the control unit. In this manner, the control unit is informed whether or not command chaining is specified for the current CCW. When an I/O operation is completed and the chain-command flag is set to one and the chain-data flag is set to zero, command chaining is permitted, provided no abnormal conditions are detected and all other conditions for chaining are satisfied. When command chaining takes place, the next command and associated flags and count become current and the next I/O operation is considered to have started. The next command and associated flags and count are found in the next command IU received with chaining bit (CH bit) set to one and the data-chaining-update flag (DU command flag) set to zero. The control unit ensures that command chaining is occurring at the proper times by recognizing a command-chaining condition. The command-chaining condition is recognized for each device. The command-chaining condition is set as the result of command chaining or as a result of command retry. During command chaining, the command chaining condition is set whenever the device accepts a command and the CC flag is set to one and the CD flag is set to zero in the CCW-flag field of a command IU.

The command-chaining condition is set for command retry when the CH bit is set to one in the IU used by the channel to accept the status that requests a command retry. (See command retry "Command Retry.") When the command chaining condition is set and the conditions for not sending status at the completion of execution of the current command are all met the control unit performs command chaining by starting execution of the command in the next command IU with the CH bit set to one and the DU command flag bit set to zero. (See "Status DIB Structure" for the conditions when status is sent and when chaining occurs at the control unit.) If command chaining condition is set but the channel has requested that status be sent at the completion of execution of the current command, the control unit sends status to initiate command chaining with the channel. In this case command chaining does not occur until the channel receives status with device end indicated and the channel sends a command IU for the next command to be executed.

The command-chaining condition is reset whenever (1) system reset or selective reset is performed,
(2) the device receives a cancel or stack-status in a control IU.
(3) status containing channel end but not device end for an I/O operation has been accepted by the channel and the chaining bit is set to zero in the status-accepted IU,
(4) status containing device end for an I/O operation has been accepted by the channel using an accept-status IU,
(5) an address-exception condition is recognized and a control IU with a device-level-exception indication is sent, or
(6) the channel accepts a valid status DIB with the AS bit set to one and the status contains unit check (except when command retry is requested and the retry requested is to be honored by the channel), unit exception, busy, attention, status modifier without any other bits set, or control-unit end, provided it is not control-unit end alone. A valid status DIB for which the AS bit set to zero does not suppress command chaining.

Command chaining occurs whenever the command chaining condition is set at the device, and the CH bit and the DU bit are set to one and zero, respectively. If the command-chaining condition is set at the device, the control unit ensures that the path to the device remains available when device-end status is presented until the next command is recognized or until the command-chaining condition is reset. If the command-chaining condition is set at the device and if a command IU is recognized with the CH bit set to zero or the DU flag set to one, a device-level protocol error is detected. If the command-chaining and the data-chaining conditions are both not set and if a command IU is recognized with the CH bit set to one, then a device-level protocol error is detected.

E. I/O Synchronization Control

The Fibre Channel interface architecture provides the protocols necessary to allow the pipelined execution of CCWs, thus reducing overheads required for the execution of S/390 channel programs. However, not all channel programs can execute correctly if prefetching is performed. For example, channel programs that modify themselves during execution by reading CCWs into the CCW stream will not work as intended if the CCWs are prefetched from memory. Thus the ability for the channel to do prefetching is explicitly enabled by the software via an existing parameter in the Operation Request Block (ORB P bit). The definition of channel program prefetch is expanded to include both CCWs and the associated data (when its a write).

Even when the channel is permitted to prefetch CCWs and data by the software, there are times when it is necessary that the pipelining of CCWs must stop and the channel wait for the execution of all the outstanding commands complete before resuming the execution of the channel program and continue pipelining. This synchronization point is needed when the CCWs being executed transition from a read command to a write command. The synchronization is required just in case the channel program is reading data into the same buffers that will be used for the write command. If the channel did not synchronize on this transition from read to write CCWs then the wrong data may be written to the I/O device. The cost and complexity for the channel to determine if the same storage locations and lengths are used for the command is too costly to implement because of the additional channel overheads and development complexity.

There are many examples of where the software builds channel programs that have many read/write transitions and thus would not be able to benefit from CCW pipelining. Examples include DASD channel programs with multiple domains (the LOCATE Record CCW looks like a write command), printer channel programs, CTC communication (MPC protocol), etc. In all these cases the software knows that the same storage locations are not being used for both the read and write buffers. A new parameter is invented for the ORB that allows the program to override the channel read/write synchronization in order to optimize performance. This parameter is known as the I/O Synchronization Control. This parameter is specified by the applications that build virtual/real channel programs. The system can automatically set the I/O Synchronization override in cases where virtual channel programs are converted to real channel programs, with some degree of accuracy.

The present mechanism provides for the software (application and operating system) to override I/O synchronization points to reduce overheads and improve I/O response times.

F. Device-Level Controls

Device-level controls are used to modify or control the execution of an I/O operation, or to place the control unit and device in a known state. Most device-level controls are specified by combinations of bits in the device-header flag field and the IUI field in the IU header. For command and Control IUs, device-level controls are also specified in the command or control DIB. For other IU types, device-level controls are specified only by the device-header flag field and IUI field.

Stacking Status Function

The stack-status control function indicates that the channel does not accept the status; the control unit or device is to hold the status information (status flags, status byte, and status parameter) and associated supplemental status, if any, until requested by the channel or until status information is cleared, withdrawn, or unstacked.

Cancel Function

The cancel function causes the designated device to terminate execution or perform nullification of the current operation, if any. When the channel has initiative to send a cancel IU during data transfer for a write operation, it stops data transfer for the write operation. The last IU sent for the data transfer contains either a command-data DIB or data DIB with the E or EE bit set to one and contains valid CRC.

Request-Status Function

The request-status function indicates that the channel is prepared to have pending status information presented for the addressed device. The status must be associated with the logical path on which the request-status IU was received. Request status has no effect on status associated with logical paths other than that on which the request status was received. The request-status control function can be used to obtain stacked status or to obtain supplemental status when the control unit indicates supplemental status is available.

Status-Acceptance Function

The channel indicates that status is accepted in several ways, depending on whether the status is for an I/O operation, whether the channel intends to perform command chaining, and, if command chaining is to be performed, whether the status contains device end. If the status is considered by the channel to be unrelated to an I/O operation or if the channel does not intend to perform command chaining, the channel indicates that status is accepted by sending a status-accepted IU with the chaining (CH) bit in the device-header flag field set to zero. If the channel intends to perform command chaining and the status DIB has the channel-end status bit set to one and the device-end status bit set to zero, the channel indicates that status is accepted by a sending a status-accepted IU with the CH bit set to one. If the channel intends to perform command chaining and the status DIB has the device-end status bit set to one, the channel indicates implicitly that the status is accepted by sending a command IU with the CH bit and the SYR flag set to One. (See "Command Chaining") A control unit indicates to the channel that it recognizes the status-accepted IU by sending a DACK IU. The CCW number and token from the status-accepted IU is used in the DACK sent. The channel can consider the status-accepted function to have been performed when it receives the DACK IU. When a status-accepted IU is sent the channel may elect to either leave open or close the outbound exchange, depending on conditions at the channel and whether or not the control unit had requested to leave the exchange pair open. If with the status transfer containing channel-end status without device-end status the control unit requests that the exchange pair be left open and conditions at the channel allow for leaving the exchange pair open, the status accepted IU is sent and the outbound exchange is left open. If the control unit did not request for the exchange pair to be left open, status other than channel end without device end is presented, or conditions at the channel do not allow the exchange pair to be left open, the status-accepted IU is sent and the outbound exchange is closed.

Device-Level-Acknowledgement Function

The device-level-acknowledgment (DACK) function indicates that the control unit has recognized a corresponding stack-status, cancel, system-reset, selective-reset, request-status, or status-accepted IU. For this use of the DACK function, refer to:

"Stacking Status Function,"

"Cancel Function,"

"System-Reset Function,"

"Selective-Reset Function,"

"Request-Status Function," and

"Status-Acceptance Function."

IV. Command Reset/Recovery and Retry—Abnormal Conditions

A. Exchange Recovery on a Fibre Channel Link

In an ESCON environment, a variety of errors can occur which potentially affect the integrity of dynamic connection through the ESCON switch. For this reason, the Connection Recovery procedure was invented. This is a protocol which involved the sending of special continuous sequences to both ends of the connection. The protocol was designed to be robust in the presence of errors, and to guarantee that, if completed successfully, the connection would be known to be removed at both endpoints as well as at the switch, and all frames associated with the removed connection would be purged from the network. The connection recovery protocol thus provided the dual functions of connection removal and endpoint synchronization. After completing connection recovery, the endpoints were returned to a known state, and could then establish a new connection to complete the required link or device level recovery procedures. (It should be noted that the term 'endpoint synchronization' as we are using it in this document refers to the returning of both endpoints of a connection to a known state, and not to the establishment of bit or character synchronization of the fiber link).

The FC-SB2 Architecture uses two FC-2 exchanges to perform all operations on the Fibre Channel link. The first is opened by the channel and is used to send Information Units (IUs) from the channel to the control unit, and the other is opened by the control unit and is used to send IUs from the control unit to the channel. These two exchanges are associated for the duration of the operation, and are referred to as an exchange pair. The architecture specifies rules for managing exchange pairs. An exchange pair in FC-SB-2 is analogous to a connection in ESCON, a major difference being that in FC-SB-2, multiple, independent exchange pairs may be active concurrently between a channel and a control unit.

As with an ESCON connection, various error conditions can effect the integrity of an exchange pair, therefore as in ESCON, a protocol which allows exchange pairs to be reliably removed and the endpoints of the exchange pair to be re-synchronized after an error is required. Since FC-SB-2 uses the FC-PH standard as its underlying transport, the protocol must use only FC-SB-2 IUs and existing FC-PH-defined link services.

Our invention satisfies the above requirement through the combined use of two separate procedures: the Abort Exchange procedure and the Purge Path procedure.

Abort Exchange

When an error occurs which affects the integrity of an exchange pair, the first action performed by the N_Port detecting the error is to send the FC-2 basic link service Abort Sequence (ABTS) for BOTH exchanges of the exchange pair, not just the one initiated by the N_Port which detected the error. If an N_Port receives an ABTS for one of the exchanges of an exchange pair, it is required to send ABTS to close the other exchange of the pair. It is important that all N_Ports send or receive an ABTS for both exchanges of the pair. This both simplifies the recovery and assures that for all recovery windows, both exchanges will closed at both endpoints.

Purge Path

The Abort Exchange procedure provides the 'connection removal' attribute of the ESCON connection recovery, but, by itself, it does not provide endpoint synchronization. The following flow diagram illustrates a problem where, under certain conditions, recursive recovery loop could occur:

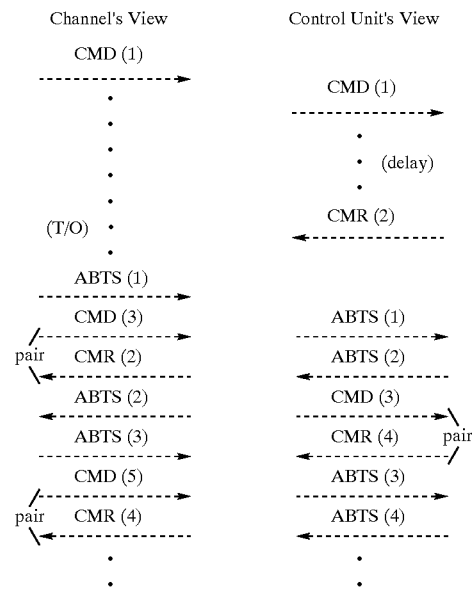

The problem can potentially occur whenever the required recovery action following ABTS is simply to re-transmit the original IU. In the above example, the channel sends a Command on exchange (1).The Control unit receives the command, but it's Command Response (CMR) sent on exchange (2) is delayed (possibly because of queuing delays, etc). The channel times out waiting for the CMR, performs ABTS for exchange (1) as required, and re-sends the Command on a new exchange (3). After this, the original CMR on exchange (2) arrives at the channel, and the channel interprets this as the response to it's command sent on (3). Consequently, it views (2) and (3) to be an exchange pair. When the ABTS for (1) arrives at the control unit, it sends ABTS for (2) per the recovery rules. It then sees the re-transmitted command on exchange (3) and generates a CMR on exchange (4), so it now considers (3) and (4) to be a pair. When the ABTS for (2) arrives at the channel, it will send an ABTS for (3). The channel and control unit have gotten out of sync, and an endless repetition of the above sequence occurs.

To achieve endpoint synchronization in the FC-SB-2 environment, it is necessary to send 'something' from one of the endpoints to the other. The receiving endpoint must return a response to the 'something' to the sender. When the sender receives the response, it is assured that all latent IU's have been purged from the path, and that it may then proceed with it's required recovery actions. The required characteristics for 'something' are as follows:

- It must carry enough information to be able to be identified by the receiver as pertaining to the specific operation which is to be recovered. Since multiple operations may be executing concurrently between a channel and a control unit for different logical paths, or for different devices on the same logical path, it must be an FC-SB-2 IU which carries all the device level information pertaining to the affected operation (i.e. it must be an FC-SB-2 device level IU).
- It must not cause the operation at the device to be affected in any way. That is, it must not change the state of the device, or cause a reset to occur, etc. Thus it can not be one of the existing SB-2 'termination' functions such as Cancel, Selective Reset, etc.

To meet these criteria, two new FC-SB-2 device level control IUs, Purge Path and Purge Path Response were defined in the FC-SB-2 architecture. The protocols for the use of these IUs are as follows:

- Purge Path is sent only by a channel. It is sent whenever an outbound exchange is aborted at the channel (either by sending or receiving an ABTS), and that exchange was associated with a device level operation.
- Purge Path uses the logical path and device address information from the affected operation, and contains a unique token.
- All inbound exchanges opened for the affected logical path and device received either before of after Purge Path is sent but before the Purge Path Response is received are aborted (via the transmission of ABTS) by the channel. Any IUs received on the exchanges to be aborted are discarded.
- When the control unit receives a Purge Path, it closes any inbound or outbound exchanges open for the affected logical path and device (via the transmission of ABTS) and sends the Purge Path Response on a new exchange with the same token and addressing information received in the Purge Path. The state of the addressed device is not changed in any way.
- After sending the Purge Path, the channel waits for a Purge Path Response IU on a new inbound exchange containing the same addressing information and Token which were sent in the Purge Path. If the channel receives a Purge Path Response from the same logical path and device but with a different token, this is not considered a valid response to the Purge Path, and the inbound exchange on which the Purge Path Response was received is aborted per the third rule above.
- When the channel receives a valid purge path response with the expected addressing information and token, it sends a Link Level Acknowledgement (LACK) to close the outbound exchange on which the Purge Path was sent. After sending the LACK, exchange recovery is complete at the channel and it may initiate any required procedures to recover the affected operation at the device. Similarly when the control unit receives the LACK, it considers the exchange recovery to be complete, and it may also initiate any additional recovery procedures at that point.

As an example of the endpoint synchronization provided by the purge path procedure, the following is the error scenario pictured above with the addition of Purge Path:

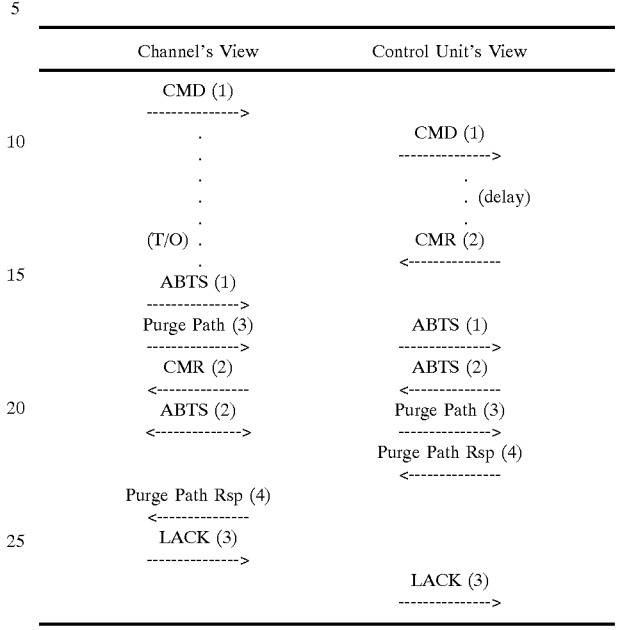

In this diagram, the channel sends Purge Path instead of re-sending the command. This allows the CMR which was held up in transmission to be received and discarded before the purge path response is received. After the completion of the purge path procedure, the channel may re-send the command without the exposure of an ambiguous response.

Purge Path in a Bridge Environment

The requirement for endpoint synchronization exists in the FC to ESCON bridge environment also, but the implementation requirements are different:

- To achieve the desired result, the IU used for the purge path function must be translatable into an ESCON frame and sent to the ESCON control unit. So the Purge Path IUs defined above cannot be used.
- Because only a single operation (link or device level) may be in progress between the channel and an ESCON control unit at a time, logical path and device addressing is not required. Also because of this, however, the purge path procedure must be performed for both link and device level operations.
- The same requirement that the IU used for purge path must not affect the state of any logical paths or devices at the control unit also exists in the bridge environment.

For these reasons, Test Initialization (TIN) IU was chosen for the purge path IU in the bridge environment, with the Test Initialization Response (TIR) serving as the purge path response. The rules for sending TIN to invoke the purge path procedure at the bridge are the same as those listed above for the native environment, with the following additions and exceptions:

- TIN is sent whenever an outbound exchange is aborted at the channel, regardless of whether the outbound exchange was opened for a link or device level operation.
- The bridge does not abort any exchanges as a result of receiving a TIN. It may abort an inbound exchange as the result of the channel aborting it's outbound exchange prior to sending the TIN.

It is not necessary to receive a TIR response to the TIN in order to verify that the path is flushed. Any response which is sent by the control unit, such as Link Busy or Link Reject will provide equivalent information, as long as the token in the response matches that in the TIN (Link Busy could be encountered in a link level frames passing situation where the channel must defer). Responses sent by the bridge (Port Busy or Port Reject) must be retried.

After sending a TIN, the channel holds any initiation IU it receives and continues to wait until it receives one of the following, with the same token as contained in the TIN:

TIR
Bind Established
Link Busy
Link Reject

If, while waiting, the channel receives an ABTS for an inbound exchange, it discards all IUs received on that inbound exchange, but does NOT abort the outbound exchange on which the TIN was sent. After receiving one of the above responses and completing the link protocols associated with that response, the pipe may be considered purged and the original operation may be retried.

If any of the following responses from the Bridge are received with the same token as the TIN, the channel aborts both the outbound exchange on which the TIN was sent, as well as any inbound exchange open from the bridge, discards any IUs received on that inbound exchange, and re-transmits the TIN on a new outbound exchange with a different token:

Port Busy
Port Reject
No response (timeout)

Note that the exchange on which the PBY or PRJ is received does not have to be aborted, since it is always a single-frame sequence which both opens and closes its exchange.

Command Retry

A control unit may request command retry for a command either when an error detected at the control unit prevents execution of the command or when an error detected at the channel results in the control unit receiving a channel-initiated-retry request and the request is accepted. When command retry is performed by the channel as the result of receiving a command retry request from the control unit, the command specified by the CCW number received with the command retry request is re-sent. The command IU has the CH bit and the SYR bit set to one and the DU bit set to zero. If the CCW # received is not valid or does not correspond to a CCW that can be made current again at the channel, the status is accepted, command retry is not performed, and execution of the channel program terminated.

B. SYSTEM-RESET FUNCTION

The system-reset function is performed by the control unit with respect to a logical path whenever any of the following conditions is recognized by the control unit:

A valid device-level system-reset IU is received on the logical path. A device-level system-reset IU is always sent with the AS bit set to zero.

The logical path is removed or established.

Certain internal recovery procedures occur within the control unit.

C. SELECTIVE-RESET FUNCTION

The selective-reset function causes a device and its status to be reset with respect to the particular logical path. Only the device and certain allegiances associated with the designated logical path are reset. The definition of the reset state of the device is model dependent.

D. Device Level Exception

A control unit uses the device-level-exception function to indicate that an abnormal condition was recognized in the IU received for which the sending of status is inappropriate or not permitted. The abnormal condition is indicated by the exception code present in the first byte of the control-parameter field. For brevity, a control IU indicating device-level exception is referred to as a device-level-exception IU.

A device-level-exception IU is sent only by a control unit.

E. Retention of Logical Paths During Transient FC-PH Link Failures

Transient events such as noise bursts or loose cables can cause an FC-PH N_Port to detect a link failure. This present invention describes a procedure which allows the N_Port to retain SB-2 upper level protocol information relating to logical paths after the link failure ends. The invention consists of two phases: a) transient link failure detection, b) transient link failure recovery. Distinguishing transient link failures from more extended link failures has two advantages: First, it allows SB-2 operations to continue normally after transient link failures, and second, it provides a means for a control unit to immediately release resources associated with SB-2 logical paths during extended link failures when there is a high probability that the logical paths are no longer usable.

It is important to maintain SB-2 logical paths during transient link failures to avoid these transient errors from being escalated to the System Control Program with possible loss of reserves at the device and possible loss of access to the device.

An FC-PH link failure occurs if FC-PH synchronization is lost for at least 100 ms. This can result from transient conditions such as a loose connection or noise burst. After the transient condition disappears, the link may continue to operate normally. In this situation, there is no reason to reinitialize SB-2 logical paths after the FC-PH link has been successfully resynchronized. If loss of synchronization remains for an extended period, however, there is a high probability that a more serious problem exists and that reinitialization of SB-2 logical paths will be required to resolve the problem. Thus the first concept of this disclosure is the recognition of a distinction between an FC-PH link failure and an SB-2 or upper level protocol link failure. An SB-2 link failure is defined as an FC-PH link failure of a duration longer than 1.5 seconds (SB_TOV). Logical paths are unconditionally removed after an SB-2 link failure, but logical paths may be retained after an FC-PH link failure provided the recovery procedure below is successfully performed.

An additional aspect of this invention in configurations involving a switch (fabric) provides a control unit the means to detect a remote FC-PH link failure, or a link failure which occurs on a link to a channel which is connected to another F_Port on the fabric. A remote link failure at a channel is detected when the control unit receives either 1) a "registered state change notification" extended link service command from the fabric controller which indicates an event has occurred at the channel, or 2) an N_Port login command from the channel. Either of these events indicates that a link failure or other problem may have caused a channel to remove a logical path which existed on the link between the channel and the fabric.

Transient Link Failure Recovery

In order to retain SB-2 logical paths after a transient link failure, the following recovery procedure must be performed within a prespecified time period:

1) The N_Port which detected the failure must verify that it is connected is the same N_Port or F_Port as it was before the failure, and
2) The existence of the logical paths which were present before the failure must be verified after the failure within a prespecified time limit.

To accomplish 1) above, the N_Port which detected the failure verifies that the N_Port_Name of the attached N_Port (or the F_Port_Name of the attached F_Port) is the same as before the failure. This is done during N_Port (or F_Port) login. Logical paths are only retained if the N_Port_Name (or F_Port_Name) of the attached N_Port (or F_Port) has not changed. This is a well understood procedure which is typically performed to determine whether a cabling change has occurred whenever there is any indication that a cabling change might have occurred.

To accomplish 2), a control unit which detects the link failure is given initiative to perform the Test Initialization (TIN) function with all channels with which it had logical paths established on the link on which the FC-PH link failure occurred. For point to point configurations, the link attached to the control unit is the only link on which all logical paths exist, so the TIN function is performed only with the attached channel. For fabric configurations, the channels to which the TIN function is performed depends on the link on which the failure occurred:

If the FC-PH link failure occurred on the link attached to the control unit, the TIN function is performed with all channels to which the control unit had a logical path established.

If the FC-PH link failure was a remote link failure, then the TIN function is performed only with the channel which is attached to the link on which the FC-PH link failure occurred.

A control unit performs the TIN function by sending a TIN request and awaiting a reply. The TIN request requires the channel to respond with an indication of the logical paths which it considers to exist between it and the control unit. If the destination channel responds with an indication that all logical paths which were present before the failure are still present, then the logical paths to the channel and the associated resources are retained. If no response to the TIN request is received in a pre-specified time interval (referred to as RA_TOV), then the control unit retries the TIN function. If, after multiple retries, either no response is received within a longer time interval (referred to as LP_TOV) after the first detection of the link failure, or if a response is received indicating that the logical paths which were previously established are no longer established, then a control unit removes all logical paths to the channel to which the TIN was sent and frees all resources associated with the logical paths. The value of LP_TOV used to await the response to the TIN is of sufficient duration to allow multiple attempts to send a TIN and await a response to be performed. This longer time interval allows multiple intermittent FC-PH link failures to occur during the LP_TOV time period without causing the automatic removal of logical paths. A value of 4 seconds, or between 3 and 4 times the SB-2 link failure time (SB_TOV) is chosen. During the LP_TOV time period when attempts to verify the logical paths are being made, the detection of additional FC-PH link failures on the attached link or the remote link does not restart the LP_TOV time period.

The advantage of this procedure is that it avoids time consuming upper level protocol re-initialization after transient FC-PH link failures. It also provides a method to release unused resources for use by other operations which require them.

A different scheme using the FDISC and PDISC FC-PH extended link services had been developed for FC-PH loops (FC-AL). These extended link services allow one N_Port to determine whether or not it is logged in with another N_Port after a loop initialization without affecting existing exchanges. This provides the means for the retention of upper level protocol information pertaining to the exchanges after a loop initialization. It does not provide, however, the means to verify logical paths, however, since the existence of logical paths is independent of the existence of exchanges. The FC-AL scheme also does not specify that resources are to be automatically released during longer link failures caused by intentional cable disconnections or frequent transient link failures. The release of resources after extended link failures or multiple intermittent link failures is an important aspect of this disclosure because it prevents the needless retention of unused resources from impacting operations which require the resources.

V. Pacing Sequences to a Control Unit

A. IU Pacing

IU pacing provides a method by which a control unit, for each channel program, can limit the number of IUs sent by the channel without an intervening response. Each channel provides an IU pacing credit which is initialized to a model dependent value at the start of each channel program. The initialized value of the IU pacing credit can be modified by the control unit at the start of a channel program or at each time the control unit reconnects with device-end status. At the start of a channel program the control unit modifies the IU pacing credit by providing a pacing parameter in either the command response or status sent in response to the first command of the channel program. The pacing parameter defines the maximum number of IUs that a channel can send on a given exchange before it receives a command response IU. (See "Command Response" and "Pacing Parameter" for information on how the control unit sets the pacing parameter.)

If the control unit sets the pacing parameter to zero, the IU pacing credit value of the channel is not modified. At the start of a channel program the channel sends a model dependent number of IUs to the control unit. The number of IUs sent can not exceed the IU pacing credit value. After some model dependent number of IUs are sent and prior to the transmission of the last IU that is allowed to be sent, a channel will request a command response to be returned by setting the PCI bit in a command or command-data DIB. The PCI bit must be set such that the remaining IU pacing credit does not prevent the transmission of all of the IUs for a CCW. Upon receipt of this command response, the channel is allowed to send an additional number of IUs as defined below.

If the control unit elects to modify the IU pacing credit at the channel by proving a pacing parameter in the command response or status DIB sent for the first command of the channel program, this new value when accepted becomes the current IU pacing credit and the remaining number of IUs the channel can send. At each disconnection the IU pacing credit is reset to the initial model dependent value. Subsequent command responses received by the channel during the connection allow it to send an additional number of IUs beyond the IU for which the command response was sent equal to the value of the pacing parameter.

Note that if the control unit has lowered the value of the IU pacing credit, the channel may have already sent all the IUs which are allowed by a given command response IU. In this case, the channel awaits additional command response IUs before sending additional IUs. When a command response IU is received which allows more IUs to be sent, the channel sends additional IUs as needed and allowed, and sets the PCI bit whenever needed in order to solicit further command responses as required. If a disconnection occurs during the channel program and the control unit initiates a connection to continue the channel program, the control unit may change the default value of the IU pacing credit. The IU pacing credit used by the channel for the continuation of the channel program is equal to the pacing parameter value provided by the control unit in the status DIB, if a value was set, or the model dependent default value of the channel if the pacing parameter is zeros.

NOTE ON THE DEFINITION: The pacing function is only defined for transmissions from the channel to the control unit. It is not required for control unit to channel transmissions because resources are already allocated in the channel prior to execution of the channel program.

B. Zero CCW Count

When a CCW is fetched containing a count field of zeros, the CCW count field of the command IU is likewise set to zeros. When the control unit executes a command with a CCW count of zero, the type of response sent to the channel, if any, and whether or not command chaining, if indicated, occurs depend on how the command is executed and the flag bits in the command header for the command.

If the first command of a channel program is executed as an immediate operation, a data IU containing a status DIB is sent. The LR bit and the RV bit are set to zero. The E-bit is meaningless for this case.

Command chaining, if indicated, is initiated by the channel when device-end status is received and the conditions for command chaining at the channel are satisfied. If the first command of a channel program would have been executed as a non-immediate operation had a count other than zero been provided, a command response IU is sent. If nullification is in effect at the control unit, execution of the command and chaining to the next CCW requires receipt of the accept-command response from the channel. If nullification, is not in effect at the control unit execution of the command and chaining to the next CCW can proceed after the command has been accepted and the command response sent.

If other than the first command of a channel program is executed and the PCI bit and SSS bit in the command header are both set to zero, no response is sent to the channel and command chaining, if indicated, occurs at the control unit, (See "Command Chaining.")

If other than the first command of a channel program is executed and the PCI bit and the SSS bit are both set to one, a command response IU followed by a data IU containing a status DIB are sent. The E bit in the IU header is set to zero by the sender and ignored by the receiver, and the RV bit in the status-flags field is set to one for a residual count of zero. If the command would have been executed as a non-immediate operation had a count other than zero been provided, the LR status flag bit is also set to one; otherwise, the LR bit is set to zero.

Command chaining, if indicated, is initiated by the channel when DE status is received and the conditions for command chaining at the channel are satisfied. (See "Command Chaining.") If other than the first command of a channel program is executed and the PCI bit is set to one and the SSS bit is set to zero, a command-response IU is sent.

Command chaining, if indicated, occurs at the control unit and no status IU is sent. If other than the first command of a channel program is executed and the PCI bit is set to zero and the SSS bit is set to one, a command response is not sent but a data IU containing a status DIB is sent. The E bit in the IU header is set to zero by the sender and ignored by the receiver, and the RV bit in the status-flags field is set to one for residual count of zero.

If the command would have been executed as a non-immediate operation had a count other than zero been provided, the LR status flag bit is also set to one; otherwise, the LR bit is set to zero. Command chaining, if indicated, is initiated by the channel when DE status is received and the conditions for command chaining at the channel are satisfied. (See "Command Chaining.")

NOTE: See IBM Enterprise Systems Architecture/390 Principles of Operation, SA22-7201, to determine when a count of zero is valid in a CCW.

Whether a control unit considers a count of zero to be valid for a command is model dependent.

C. Sending Sequences to the Control Unit

Without some sort of pacing at the FC4 layer of Fibre Channel an individual channel program could use up all the buffers in a Control Unit. The Fibre Channel FC2 layer protocol will keep the FC4 from losing data but does nothing for fairness among channel programs.

In order to resolve this problem, the present invention provides a solution to have the Fibre Channel send a limited number of sequences to a Control Unit and then wait for the Control Unit to response with some type of indication of the number of sequences it has executed. The channel will then send that number of sequence to the Control Unit. This can then continue on indefinitely.

Pacing in this case is controlled by the channel, using existing protocol constructs at the FC4 layer. (See reference one). The channel at initialization time assumes a preset value for pacing. The control unit can change this value at Command Response time or Status time of the first CCW of a chain by inserting a value other then 00 in word one byte one in the Command response Sequence or Status Sequence.

A value of 00 means do not change the current pacing value. A value other then 00 will be used as the new pacing value. The channel will default to the initial pacing value after a physical disconnect or between starts.

For the following discussion X is equal to the number of sequences a channel can send to a Control Unit before waiting for Command Response. The channel will be initialized with X equal to 17 for Fibre Channel attached Control Units. At initial status or Command Response time X can be changed by the Control Unit with a value in the range of 17 to 255. Values of 1 to 16 would require more rules because one write CCW could require 16 sequences to send all the data for that CCW. For this to work at least one CCW and its data plus one more CCW and part of it's data, if a write, has to fit within X sequences. Thus a Control Unit can not decrease the channels initialized value.

The channel has to keep flags on a CCW bases to sort out if the Command Response is for initial status, pacing, system PCI or any combination of all three. A Command Response received by the channel means that the sequences, between the CCW a previous command response was received for and the CCW-1 the current Command Response was received for, are now available. Assuming that X is equal to 32 then the channel would insert the PCI flag in a command sequence that occurs at or close to 16 sequences sent by the channel. The channel then sends 16 more sequences of CCWs and data and then again set the PCI flag in a command sequence that is at or close to 32 sequences. Thus when the Control Unit Executes the first 16 sequences, it will send a command response back to the channel in response to the PCI flag in the command sequence. The control unit has 16 more sequences to execute before it runs out of work for this CCW string. The channel on seeing the Command Response sequence from the Control Unit will send n more sequences to the Control Unit, assuming the CCW chain is not completed. N is equal to the number of sequences between the CCW the command response is for and the CCW the previous command response was for, or on start up the first CCW.

VI. Executing Search Commands Locally Using a Control Unit

Count Key Data (CKD) CCW chains generally contain a search transfer in channel (TIC) back to the search command. In ESCON architecture the control unit returns the CE, DE status back to the channel on the search CCW and the channel then re-sends the search CCW and its associated data back to the control unit as the next CCW. When the search argument is satisfied at the control unit, CE, DE and SM status is sent to the channel causing the channel to go on to the next CCW. This procedure does not take advantage of the function of pipelining and impacts performance since only one CCW can be sent to the control unit at a time. This invention adds some control functions to allow the control unit to independently manage the search TIC operation and, as a result, take advantage of the performance benefits of pipelining.

To address this problem, when pipelining a CCW chain with a TIC-8, the present invention provides for the channel to send the CCW command with a flag bit (control function) that tells the control unit to continue to re-execute the command as long as CE, DE status is generated by the command. This occurs without interaction with the channel. When status of CD DE and SM is generated, the control unit will not execute the TIC-8 again and instead continue on to the next CCW command. If at any time status other then CE, DE and or SM is generated the control unit sends that status back to the channel and the operation will continue or terminate as with prior art.

The Repeat Execute (REX) flag, bit 6, of the Command-Flag Field in the Command Header when set to one, indicates that the channel is requesting the control unit to perform the transfer-in-channel function by repetitively executing the command in the command header. The channel sets the REX bit for a command only when the CCW containing the command has the CC bit set to one, the CD bit set to zero, and the next CCW (the one to which chaining will occur) contains a transfer-in-channel command and an address of the previous CCW. When the control unit recognizes this indication, re-execution of the current command is performed until one of the following conditions occur:

1. Execution of the command results in status of other than channel end and device end alone being recognized.
2. Execution of the command has been performed 128 times.
3. Execution of the command is terminated by a cancel, selective reset, or system reset.

When an execution of the command results in status of channel end, device end, and status modifier alone being recognized, chaining to the next command occurs at the control unit.

When re-execution of the command is performed 128 times without status other than channel end and device end alone being recognized, re-execution of the command is terminated and the status recognized for the last execution of the command is sent to the channel.

When execution of the command results in status of other than channel end and device end alone or channel end, device end, and status modifier being recognized, re-execution of the command is terminated at the control unit and status is sent to the channel.

Search TIC Loop

The following is an example of how a Search TIC loop CCW string is handled by Fibre Channel. This example is representative of the seek, set sector, search ID equal case. The following Table is how a CCW list may appear in 390 storage.

TABLE 1 shows CCWs in a large host system such as IBM's S/280 storage

| SEEK | 008 WRITE | - CCW 1 | 100 READ | - CCW4 |
|---|---|---|---|---|
| SET SECTOR | 010 WRITE | - CCW 2 | 108 READ | - CCW5 |
| SEARCH ID | 018 WRITE | - CCW 3 | | |
| | 020 TIC TO 18 | - TIC TO CCW 3 | | |
| | 028 TIC TO 100 | - TIC TO CCW 4 | | |

The CCWs in case one are sent to the control unit in 5 sequences back to back as shown below. See reference 1 for protocol details. CCW 3 is flagged with the Reexecute flag (REX) such that the Control Unit will continue to re-execute it until either an exception condition is reached or the CE-DE-SM condition is reached. If an exception condition occurs, status is presented to the channel with a CCW number of 3 in the status frame. When the CE-DE-SM condition occurs CCW 4 is then executed.

TABLE 2

CCWs as they appear at the Control Unit.

| CCW | |
|---|---|
| CCW 1 WRITE<br>FLAG = CC<br>DATA | |
| CCW 2 WRITE<br>FLAG = CC<br>DATA | |
| CCW 3 WRITE<br>FLAG = CC & REX<br>DATA | CU RE-EXECUTES THIS<br>CCW AS LONG<br>AS THE STATUS IS CE &<br>DE ONLY. |
| CCW 4 READ<br>FLAG = CC | CU EXEC. THIS CCW WHEN<br>CE-DE-DE STATUS OCCURS<br>FOR THE ABOVE CCW |
| CCW 5 READ | CU EXEC. THIS CCW WHEN<br>CE & DE STATUS OCCURS FOR<br>THE ABOVE CCW THIS IS THE<br>LAST CCW EXECUTED. |

This is the only case a Control Unit executes the next CCW with status other then CE-DE.

Software Controls for CCW Pipelining

The FICON architecture is designed to execute existing S/360, S/370, and S/390 channel programs with full compatibility to the parallel OEMI and ESCON channel interfaces. However, certain modifications to the system architecture, operating system, application programs and channel programs are required in order to obtain the maximum efficiency possible. This maximal efficiency is achieved by pipelining the execution of the channel program. This means that the CCWs and associated data (for output operations) are continuously sent to the control unit with out an explicit interlocked exchange between the channel and control unit for each CCW. This pipelining of the CCW execution reduces the link overheads and improves the execution efficiency of the channel program.

Not all channel programs can be executed with CCW pipelining. One example of a channel program that cannot be executed in a pipelined fashion is a channel program that modifies itself by reading additional CCWs into the CCW stream. If the channel program was prefetched the channel would terminate prematurely due to executing a CCW that was not modified and did not have the command chaining flag on, or terminate in error because the CCW did not arrive before the channel fetched the storage and tried to execute it as a CCW before a CCW was actually read in. Another example of a channel program that can not automatically prefetched is one where the program changes the channel program while it is executing. If prefetching were always done, the timings would change such the program would always miss the opportunity to change the channel program before it executes.

Some channel programs may always be prefetched. When unauthorized applications make an I/O request, the operating system needs to translate the virtual channel program into a real channel program. By definition, virtual channel programs cannot be self modifying. This is because at the time the channel program is built, the application cannot know the real location of the storage that will contain the translated CCWs. Thus, the channel program cannot possibly be constructed to read data into the location that the real channel program will be constructed. Additionally, the application cannot modify the channel program once it has started execution since the application cannot know where their real channel program resides once it has been passed to the operating system for execution. Therefore, the operating system may always specify that CCW prefetching is allowed for the execution of virtual channel programs.

Since real channel programs may be self modifying, or the program may modify them while executing, the I/O requester must explicitly indicate when prefetching is allowed. The S/390 architecture allows the operating system to explicitly request CCW prefetching via the P bit in the ORB (Operation Request Block).

Input/Output Synchronization

There are certain conditions that require the channel to synchronize during the execution of a channel program. This synchronization means that the fetching of CCWs and data is suspended until status is received for a particular CCW. After the status is received for the CCW being synchronized, execution of the channel program resumes. One example of a required synchronization point is whenever a channel program transitions from executing an input operation to executing an output operation. If data that is being read into a specific buffer is then intended to be written out of the same buffer within the same channel program, the channel must wait for all outstanding read requests to finish before proceeding to the execution of the subsequent write command. Its not practical for the channel to keep track of every buffer address and length for all input operations so that when an output operation is to be executed it will know whether synchronization is required or not. The channel complexity and overhead would be prohibitive. Thus, whenever the channel program transitions from an input CCW to an output CCW it will automatically synchronize to guarantee data integrity. However, there are very common channel programs that have many input/output transitions without any requirement to synchronize. A typical example is a DASD channel program that reads records from multiple extents (see example below). The Locate Record (LR) CCW is an output operation as it writes parameters to the control unit. Locate Record must be done to specify the domain before record can be read from a particular extent. If multiple domains are going to be read from in a single channel program then a synchronization event will occur at the start of every domain. Since the LR parameters are usually always disjoint from the data buffers, an override for the input/output synchronization will allow the program to optimize the channel performance.

READ/WRITE Synchronization

Channel will synchronize on input/output transitions with in the channel program:

required to guarantee integrity software may override
  IOBNORWS
  IOSNORWS

| Read Multiple Records | |
|---|---|
| Define Extent | |
| Locate Record | |
| Read | |
| Read | |
| Read | |
| --------------------> | R/W |
| Locate Record | Transition |
| Read | |
| Read | |
| Read | |
| --------------------> | R/W |
| Locate Record | Transition |
| Read | |
| Read | |
| Read | |

For virtual channel programs the operating system must scan through the channel program, page fixing the buffers and translating the CCWs into CCWs with real addresses. The translation process keeps track of the buffer addresses as it translates the CCWs so as to avoid fixing the same page more than once. It is possible for the operating system to keep track of whether or not a previous CCW was a input operation when it encounters the first write operation. It can also know whether or not the buffer was already on a page that was fixed. If both conditions are not true for any CCWs in the channel program then the operating system knows that it is safe for the channel not to synchronize on input/output transitions. The S/390 architecture allows the operating system to specify that the channel should not synchronize on input/output CCWs transitions via the Y bit in the ORB. Therefore, for virtual channel programs the operating system can automatically override the channel synchronization on input/output CCW transitions. I/O requesters that pass real channel programs to the operating system are required to explicitly indicate when input/output synchronization is not required.

PCI Synchronization

Some applications use Program Controlled Interrupts (PCI) as a means to be notified when a portion of the channel program is about to executed. The PCI interrupt gives the program the opportunity to modify the channel program to execute in a different way depending on data that may have been returned in a portion of the channel program already executed. One example of such an application is the system IEBCOPY utility. Unless the channel synchronizes on the CCW following the PCI, use of CCW prefetching would prevent the program from every successfully modifying the channel program before it is fetched by the channel for execution. This would cause an increase in the their CPU overheads for additional interrupts as the channel program is not extended, increases in channel and device overheads as additional start subchannels are required to resume execution of the channel program.

Other applications use PCI interrupts to notify the program when buffers associated with a completed portion of the channel program may be freed or reused for other purposes. This allows for more efficient use of real storage. Programs that use PCI in this way do not want the synchronization overhead described above. The S/390 architecture provides for the M bit that allows the program to request the channel not to synchronize on the CCW following the PCI. This allows for a more efficient execution of the channel program.

PCI Synchronization

Some I/O drivers use PCI to modify the channel program before it is executed:

controls provided to force synchronization on next CCW
    IOBEPCIS
    IOSXPCIS IEBCOPY Example:

```
            SET SECTOR
            Search ID Equal
            TIC *-8
            TCI *+8
            Read Key/Data (PCI)
            Read Count
==============> TCI *+8
|
==============> Read Sector (CC = 0)
|
-------------
            Read Key/Data (PCI)
            Read Count
==============> TIC *+8
|
==============> Read Sector (CC = 0)
|
-------------   ...
```

PCI Synchronization

Some I/O drivers use PCI to modify the channel program after it is executed and do buffer management:

software default is not to synchronize, optimize performance

Simple Buffer Management
  Define Extent
  Locate Record
  Read
  Read
  Read
  Locate Record (PCI)
  Read
  Read
  . . .
  Read
  Locate Record (PCI)
  Read
  Read
  Read
  . . .

VII. Transmitting Fibre Channel Sequences Concurrently Between Two ULPS in Both Direction The present Fibre Channel architecture only allows sequences to be sent in one direction or the other within an exchange. The side that opens an exchange, the Requester, can send sequences to the other side, the Responder, until the Requester side transfers initiative to the Responder in the last sequence it sends. Presently, the Responder can send sequences to the Requester until it returns initiative to the Requester side. This type of protocol inhibits doing a high performance task using hosts such as IBM's System 390 I/O FC4 using Fibre Channel as the transport.

The solution to this problem is to open an exchange in each direction and tie the two exchange IDs together at the FC4. The link address-logical Control Unit address and device address-effectively ties the two exchange IDs together. Thus one side is the Requester for exchange ID A and the Responder for exchange ID B. while the other side is the Responder for exchange ID A and the Requester for exchange ID B. This allows the channel side to open an exchange ID A to a Control Unit and start streaming out Sequences to the Control Unit. Mean while the Control Unit can open exchange ID B and start sending responses back to the channel. When the channel sends out the first request that opens exchange ID A it also includes a 3 byte token in the header of this sequence. All sequences associated with this link address-logical Control address and Unit address—will have this same token. The Control Unit will always return this same token to the channel in the sequence header when responding to any requests for this link address.logical Control Unit address.Device Address. This provides a means for the channel to quickly associate exchange B from the Control Unit to exchange A opened by the channel. This three byte token is defined by the channel and is definitive for every exchange opened by the channel.

VIII. Dis-connections and Re-connections

As described earlier, most disconnections and reconnections have become unnecessary under the teachings of the present invention. However, there are still some specific cases that needs addressing.

A. Disconnecting without Closing the Exchange Pair

In existing systems such IBM's ESCON, when a Control Unit and or device has operation to perform that may take milliseconds of time the Control Unit disconnected from the channel with Channel End status so that the channel can then do useful work with other devices. However on Fibre Channel a Control Unit does not have to physically disconnect from the Fibre Channel for the channel to do other useful work because of the multiplexing capability of Fibre Channel. Physically disconnecting and reconnecting is extra overhead that is not always required for Fibre Channel.

Under the present invention, the mechanism allows the Control Unit to inform the channel if it wants to physically disconnect from the channel or just to logically disconnect from the channel by the use of the End Connection bit.

END CONNECTION (EC): The EC bit, when set to one, in a status sequence, indicates that the control unit is logically and physically disconnecting from the channel and requesting that the exchange pair be closed. When the EC bit is set to zero, the control unit, while still logically disconnecting from the channel, is requesting that the exchange pair remain open. When, upon completion of execution of the current command at the control unit, and conditions require a logical disconnection from the channel, CE without device end status is generated and sent to the channel. When the channel receives a status sequence with CE status without device end status and with the EC bit set to zero, the channel accepts the status and depending on conditions present, either leaves the outbound exchange open or closes the outbound exchange. If the channel elects to leave open the outbound exchange, the status accepted (ACC) Information Unit (IU) sent does not close the exchange. In this case the control unit keeps the inbound exchange open when the device-level acknowledgment (DACK) IU is sent. If the channel elects to close the outbound exchange, the ACC IU sent closes the outbound exchange. In this case the control unit also closes the inbound exchange when the DACK IU is sent. If either the channel elects to keep the outbound exchange open as requested but the control unit closes the inbound exchange or the channel elects to close the outbound exchange but the control unit doesn't close the inbound exchange, a link-level protocol error is recognized. A control unit that sets the EC bit to zero for a status sequence in order to logically disconnect and leave the exchange pair open, must, if accepted by the channel, reconnect on that exchange pair; otherwise unpredictable results may occur. A logical reconnection on the exchange pair occurs when the control unit sends a status sequence containing DE status.

B. Control Units Keeping Track of Disconnect Time

In present systems such as IBM's ESCON channel, when a control unit and or a device has to execute a function that takes milliseconds of time and doesn't require the services of the channel, the control unit disconnects from the channel with channel end status. This frees the channel to work with another control unit /device. However disconnecting and reconnecting to a channel generates extra overhead which can impact I/O throughput.

On Fibre Channel, a control unit does not have to disconnect to allow the channel to do other useful work because of the multiplexing capability of Fibre Channel. When the control unit does not require the services of the channel and when a condition requires it to execute an independent function, communication between the channel and control unit can be temporarily ended; however, the connection with the channel is maintained for the duration of time the condition at the control unit exists. This condition typically occurs whenever the control unit requires the device to access the physical medium for the purpose of reading or writing data. For purposes of measuring device and channel utilization, this time interval would be recognized by the an ESCON channel as disconnect time since an actual disconnect from the channel occurred. With Fibre Channel, the same condition is encountered by the control unit; however, since no disconnect occurs, the channel would be unable to recognize the occurrence and likewise be unable to properly calculate the amount of disconnect and connect time in determining resource utilization.

Under the teachings of the present invention a means is provided for the channel to continue to properly calculate resource utilization in the new environment. This invention describes a method for the control unit to measure the time interval and to report this information to the channel. An algorithm is defined that enables the channel to properly interpret the measured time interval reported and to establish the amount of resource utilization that has occurred. For definition of terms and architecture see the following reference documents:

Status Sequence

The status header is the first 12 bytes of a status sequence. The status header has the following format:

| | | | |
|---|---|---|---|
| 0 | Status Flags | Status | Status Parameters |
| 1 | Queue-Time Parameter | | Defer-Time Parameter |
| 2 | Reserved | IU Count | Supplemental Status Byte Count |

0                              16                          31

Defer-Time Parameter

Bytes 2 and 3 of word 1 contain the defer-time-parameter (DTP). Device- defer-time is accumulated by the control unit whenever ongoing channel program execution needs to be temporarily delayed because a device-dependent action needs to be performed. This condition typically occurs whenever the control unit requires the device to access the physical medium for the purpose of reading or writing data. However, because of the device-dependent nature of the action, other conditions may also be recognized by the control unit creating the need for a temporary delay of channel program execution. In all cases, device-defer time continues to be accumulated with each successive temporary delay until such time when either the control unit forces a disconnection from the channel or execution of the channel program has been completed. If the control unit disconnects from the channel, the previously accumulated defer-time value is presented as the device-defer-time parameter along with status containing channel-end without device end (this status may or may not include command retry status). When the temporary delay of channel program execution is no longer required, the connection to the channel is reestablished and device-end status is accepted from the control unit. Device-defer time is not accumulated during the time interval of a disconnection from the channel.

If no disconnection from the channel occurs during execution of the channel program, the previously accumulated device-defer-time is presented as the device-defer-time parameter along with status of channel end signaling completion of channel program execution at the channel (status of device end may also be included with the channel-end status). In all cases, the control unit retains the defer-time information until it receives acknowledgment that the status transfer was accepted. When this has occurred, all previously stored or accumulated defer time values are zeroed at the control unit and accumulation, if any, begins anew. The defer-time-parameter is obtained in the following manner.

CONTROL UNIT TIMER

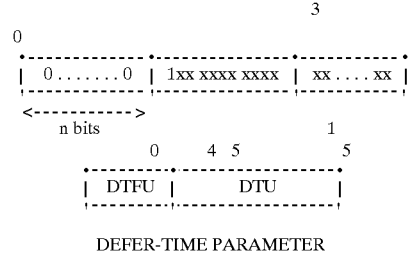

DEFER-TIME PARAMETER

0 = Binary zero
1 = Binary one
x = Any binary value

The control unit, using a 4-byte timer having a 1 microsecond resolution, derives this defer-time parameter (DTP) which contains control information and a 11-bit defer-time unit. When the channel accepts the accompanying status, it uses the control information, and is able to reestablish the 4-byte time value (with low-order truncation). DEFER TIME UNIT FACTOR (DTUF): Bits 0–4, when non-zero, specify the number bit positions the 11-bit defer time unit must be shifted. If a shift was required, the DTUF is calculated by subtracting the value of the highest bit-position (which was set to one) of the queue-time unit from 21 (this applies only in those cases where the bit position is equal to or less than 21). If no adjustment was required, the DTUF value is 00000, binary. DEFER TIME UNIT (DTU): Bits 5–15 contain the 11-bit defer-time unit accumulated by the control unit timer. The bit-significance of the time unit is specified by the DTUF. The tables shown below describes the relationship between the values of DTUF and the bit-significance if DTU.

| DTUF is: | Bit 15 of DTP represents: |
|---|---|
| 00000 | 1 microsecond |
| 00001 | 2 microseconds |
| 00010 | 4 microseconds |
| 00011 | 8 microseconds |
| . | . |
| . | . |
| . | . |
| 10101 | 2,097,152 microseconds |

In the example given below, the control unit timer has accumulated a defer time of 9,464 microseconds (X'24F8') and calculated the defer-time parameter. When received by the channel, a shift of the most significant bit of the DTU to bit-position 18 of the channel 4-byte-time-value, and bit 15 of the DTP represents a value of 8 microseconds. The low-order 3-bit positions are set to zeros. The formula used is (CHANNEL TIMER=FTU×2DTUF).

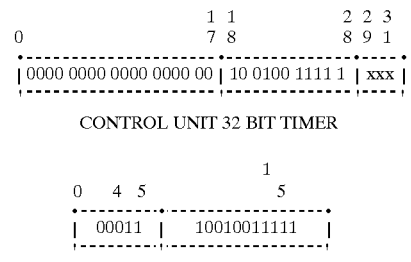

CONTROL UNIT 32 BIT TIMER

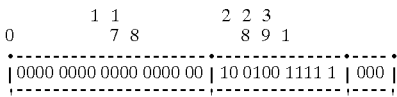

DEFER-TIME PARAMETER

```
        1 1       2 2 3
0       7 8       8 9 1
|0000 0000 0000 0000 00 | 10 0100 1111 1 | 000 |
```

CHANNEL 32 BIT TIME VALUE

VI. Registered State Change Notification—Point to Point Configuration

The Registered State Change Notification (RSCN) Extended Link Service (ELS) and the State Change Registration (SCR) ELS are currently used only in conjunction with Fibre Channel fabrics. The S/390, however, requires a method of reporting state changes in point to point configurations as well as fabrics. The use of SCR and RSCN in point to point configurations as well as in fabric configurations allows a single set of microcode to provide the state change notification function in both configurations.

The present invention provides a solution that if a channel and control unit are directly attached to each other by a single link, each one registers for state changes by sending an SCR ELS to the attached channel or control unit. Although the SCR ELS is sent to the fabric controller if a fabric is present, all other aspects of the SCR request is identical to the SCR request which would have gone to the fabric controller if a fabric were present. This allows a common microcode to be used for both fabric and point to point configurations.

In addition, S/390 needed a method of making state change mandatory. To provide this, S/390 will require users of the SCR function to reject any request to disable SCR. Once SCR is enabled by sending the SCR enable request, any subsequent requests to disable SCR will be rejected. The only means of disabling SCR is to log out with the port with which it was enabled. In order to begin operation after a logout, a new SCR enable request must be sent.

When a state change is to be reported, the RSCN notification is sent to the attached channel or control unit instead of the fabric controller. All other aspects of the RSCN notification are identical to the RSCN notification which would have been sent to the fabric controller if a fabric were present.

IX. Operational Messages—Test ELS

The present Fibre Channel adapter microcode requires a method of communicating with the control processor in a bridge using an existing industry standard Extended Link Service (ELS), but no ELS existed which was designed for this purpose. Therefore, a new way of using the TEST ELS was developed. The new use of the TEST ELS does not violate any requirements of the existing Fibre Channel specifications.

The present invention provides a solution, especially when using large systems such as IBM's S/390. When the microcode in the S/390 Fibre Channel adapter needs to convey operational messages to the control processor in the FC-ESCON bridge, it sends a TEST ELS with a payload which contains the message. The only use currently made of the TEST ELS is to send dummy payloads across the link to provide system loading; the use described here extends that usage to convey interprocessor requests and could also be used to convey other types of requests or information. The messages defined by the FC-390 Fibre Channel protocol currently include requests for error recovery information related to one or more FC-ESCON server processors in the FC-ESCON bridge. When the bridge control processor receives the TEST ELS with a payload containing such a request, it instructs the appropriate FC-ESCON server processors to send the requested information to the channel.

X. PCI Fibre Channel Cards

It is possible to use the concepts of present invention in conjunction to off the shelf PCI Fibre Channel cards. The problem is, however, that the percentage of the logic checked in these PCI cards is not up to the standards usually expected of other similar cards or components. Fibre Channel architecture provides CRC for each frame sent on the Fibre Channel link but this does not check the logic that is gathering the sequences from storage, that meets high system standards, and parses the sequences into one or more frames with generated CRC on the Fibre Channel link.

To protect the FC4 sequence headers, therefore, LRC is used. To protect the data field, CRC is used. The FC4 header is 32 bytes with bytes 28,29,30 and 31 defined as a 4 byte LRC. The last 4 bytes of data of a data sequence, that concludes a data block, is a 4 byte CRC field. The LRC provides good protection for 28 bytes of header data and is generated and checked by a micro. The data block can be any length from 0 to 65535 bytes. CRC is used to provide good protection across this much data. The LRC and CRC generation and checking is done in well check hardware providing total protection of data through out the paths traveled by the data. The Fibre Channel implementation of the SB-2 Information Unit (IU) structure is shown below.

FC-SB-2 general IU payload structure

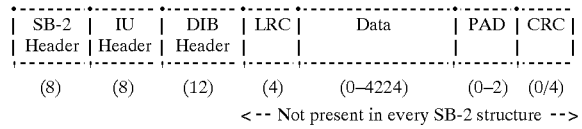

IU Payload Structure All SB-2 IUs contain the following:

1. Eight-byte SB-2 header
2. Eight-byte IU header.
3. Device-Information Block (DIB)."

A DIB contains a minimum of 16 bytes; consisting of a 12 byte DIB header followed by four bytes of longitudinal-redundancy check (LRC). For certain DIB types, a variable length DIB data field may immediately follow the LRC. The maximum length of the DIB data field is 4224 bytes. The DIB data may or may not contain the PAD and the CRC field. Longitudinal-Redundancy-Check Field. The longitudinal-redundancy-check (LRC) field contains a 32-bit redundancy-check code, immediately following the DIB header in bytes 28 to 31 of the 32 byte FC-4 header. LRC is provided only on the bytes consisting of the SB-2 header, IU header, and DIB header. The LRC generator/checker is initialized to X'A55AA55A' before the header fields are processed a full word at a time. DIB DATA FIELD The DIB Data field, if present, is a variable length field which contains either data, data and pad bytes, data and pad bytes and a CRC, or just a CRC. The CRC when transmitted is on total data count basis which can be up to 65535 bytes. So the DIB Data field that transmits the last data of a data block will contain the CRC field. It may take up to 16 DIB Data fields to transmit one data block because the maximum number of bytes that can be sent in the DIB data field is 4224 bytes. Pad bytes, if present, are contained in the last word of the last DIB data field used to complete a data transfer and are used to pad the DIB data field to the next word boundary. Cyclic-Redundancy-Check Field The cyclic-redundancy-check (CRC) field, if present in an IU, contains a word-aligned 32-bit redundancy-check code. The processing of CRC, in terms of generation and checking, follows the definition as provided in Annex N of the FIBRE CHANNEL, Physical and Signaling Interface (FC-PH). Additional information can be found in Fiber Distributed Data Interface (FDDI) Media Access Control (MAC) (ISO/IEC 9314-2:1989) appendix B. The initialized value of the CRC generator is X'FFFFFFFF'.

Detecting Lost Sequences within an Exchange on Fibre Channel

The Fibre Channel protocol provides for the detection of lost frames within a sequence but does not provide for a reliable way for all PCI Fibre Channel cards to detect lost sequences within an exchange. The present invention provides a count field in the header of each sequence that has the follows the following protocol. This count field is know as the Information Unit (IU) count. A sequence is also known as an Information Unit. Each Sequence header contains the IU count. The IU count is an eight-bit binary number that is included in every sequence sent during an open exchange. The IU count value is initialized to X'00' when an exchange is opened and the first sequence is sent. The value of zero is inserted in the IU count field of the sequence header for the sequence sent to open an exchange. After each sequence is sent the IU count is advanced by one and the new value included in the IU count field of the next sequence sent. When the IU count reaches X'FF' and additional sequences are to be sent, the IU count is permitted to wrap and the next value used is X'00'. If an sequence is received with an IU count value that is not one greater than the IU count value received in the previous sequence received, or, if the previous IU count was X'FF' and the next IU count received is not X'00', an IU count error is recognized and the sequence is discarded. When an sequence is discarded because of an IU count error, the recovery performed depends on the operation or function being performed. In some cases a retry of the operation may be attempted and in other cases the operation or function may be terminated without retry.

Selective Use of Class 2 Service in a Class 3 Fibre Channel

The complexity of a Fibre Channel implementation can be reduced and the performance enhanced by restricting it to Class 3 service if no confirmation of frame delivery is required at the link level. During normal operations upper-level protocols insure the proper level of communication integrity in the management of transferring and receiving frames. However, during initialization and some error recovery conditions, confirmation of frame delivery by upper layer protocols is not always provided.

For example, cases may exist where its necessary to determine if a node is attached and if it's operational. A frame is sent to the node, and a response is awaited. If class 3 is used and the node does not respond, no message is returned and the sender of the frame must await a specified amount of time for a response. Typically a large interval would be specified to account for transmission and internal node delays as well as the accommodation of a large variety of different kinds of configurations. This wait time causes the procedure to take an excessive amount of time, especially when multiple retries of the operation must be performed. An implementation is needed which obtains the performance benefits of class 3 while avoiding the overheads caused by class 3 during error recovery and initialization.

The FICON implementation overcomes this problem by the selective use of class 2 only during error recovery and initialization. When it is necessary to send a frame to a destination which may not be operational, class 2 is used. If the frame is not deliverable, the switch returns a response indicating this to the sender of the frame. This eliminates the long delay which would have been necessary if class 3 was used. The specific procedures in which class 2 is used are restricted to the Fibre Channel Extended Link Services (ELSs) and FICON link-level functions listed below.

FC-PH Fabric Login ELS
FC-PH N_Port Login ELS
FC-PH State Change Registration ELS
Request Identifier FICON link-level function
Test Initialization FICON link-level function The above functions are only used during initialization and error recovery. Class 3 is used for all device-level functions, which normally constitute the vast majority of all operations. (Most existing implementations simply allow the initialization and error recovery procedures to take a long time since they happen so infrequently. This is acceptable in some applications, but not most of the critical applications in which FICON is to be used.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An apparatus in a Fibre Channel linked system for sending special commands from a first N_Port to a second N_Port over a link using Test Extended Link Service commands, said apparatus comprising:

a) a fibre link attached to said first N_Port;

b) a predefined special command in a Test Extended Link Service command payload, said special command for initiating the performance of a function associated with said second N-Port; and c) a transmitter in said first N_Port for transmitting said Test Extended Link Service command containing said predefined special command over said fibre link.

2. An apparatus in a Fibre Channel linked system for sending special commands from a first N_Port to a second N_Port over a link using Test Extended Link Service commands, said apparatus comprising:

a) a fibre link attached to said second N_Port;

b) a receiver for receiving at said second N_Port, a Test Extended Link Service command, said command including a payload comprising a predefined special command, and c) a performer for performing a predefined function in response to receiving said predefined special command.

3. The apparatus in a Fibre Channel linked system for sending special commands over a link using Test Extended Link Service commands of claim 1 wherein said second N_Port responds to said Test Extended Link Service command by returning Log information.

4. The apparatus in a Fibre Channel linked system for sending special commands over a link using Test Extended Link Service commands of claim 3 wherein said Log information pertains to a unit specified by said data field.

5. A method in a Fibre Channel linked system for sending special commands from a first N_Port to a second N_Port over a link using Test Extended Link Service commands, said method comprising the steps of:

a) creating a predefined data field in a Test Extended Link Service command payload, said predefined data field comprising a predefined special command for performing a function associated with said second N-Port; and b) transmitting said Test Extended Link Service command containing said predefined special command over said fibre link.

6. A method in a Fibre Channel linked system for sending special commands from a first N_Port to a second N_Port over a link using Test Extended Link Service commands, said method comprising the steps of:

a) receiving at said second N_Port, a Test Extended Link Service command including a payload comprising a predefined special command; and b) performing a predefined function in response to receiving said predefined special command.

7. The method in a Fibre Channel linked system for sending special commands over a link using Test Extended Link Service commands of claim 6 wherein said performing a predefined function step includes responding to said Test Extended Link Service command by returning Log information.

8. The method in a Fibre Channel linked system for sending special commands over a link using Test Extended Link Service commands of claim 6 wherein said performing a predefined function step includes responding to said Test Extended Link Service command by returning Log information of a unit specified by said data field.

* * * * *